(12) United States Patent
Murray

(10) Patent No.: US 11,265,709 B2
(45) Date of Patent: Mar. 1, 2022

(54) EFFICIENT INTERNET-OF-THINGS (IOT) DATA ENCRYPTION/DECRYPTION

(71) Applicant: Zettaset, Inc., Mountain View, CA (US)

(72) Inventor: Eric A. Murray, Los Gatos, CA (US)

(73) Assignee: ZETTASET, INC., Mountain View, CA (US)

( * ) Notice: Subject to any disclaimer, the term of this patent is extended or adjusted under 35 U.S.C. 154(b) by 228 days.

(21) Appl. No.: 16/535,673

(22) Filed: Aug. 8, 2019

(65) Prior Publication Data

US 2021/0044972 A1    Feb. 11, 2021

(51) Int. Cl.
| | |
|---|---|
| H04W 12/06 | (2021.01) |
| H04L 9/32 | (2006.01) |
| G06F 21/64 | (2013.01) |
| H04W 12/03 | (2021.01) |
| H04W 12/041 | (2021.01) |

(52) U.S. Cl.
CPC ............ *H04W 12/06* (2013.01); *G06F 21/64* (2013.01); *H04L 9/3252* (2013.01); *H04L 9/3263* (2013.01); *H04L 9/3271* (2013.01); *H04W 12/03* (2021.01); *H04W 12/041* (2021.01)

(58) Field of Classification Search
None
See application file for complete search history.

(56) References Cited

U.S. PATENT DOCUMENTS

| | | | |
|---|---|---|---|
| 10,382,213 B1 * | 8/2019 | Rafn | H04L 9/3268 |
| 2012/0011360 A1 | 1/2012 | Engels et al. | |
| 2016/0127894 A1 * | 5/2016 | Kahn | H04L 69/22 |
| | | | 380/270 |
| 2016/0205106 A1 | 7/2016 | Yacoub et al. | |
| 2016/0205555 A1 * | 7/2016 | Agiwal | H04W 12/03 |
| | | | 713/168 |
| 2016/0226732 A1 | 7/2016 | Kim et al. | |
| 2016/0366105 A1 * | 12/2016 | Smith | H04L 63/0428 |
| 2017/0041316 A1 | 2/2017 | Setchell et al. | |

(Continued)

OTHER PUBLICATIONS

Krawczyk, "HMAC-based Extract-and-Expand Key Derivation Function (HKDF)", RFC 5869, May 2010, pp. 1-14. (Year: 2010).*

(Continued)

*Primary Examiner* — Benjamin E Lanier
(74) *Attorney, Agent, or Firm* — Asif Ghias

(57) ABSTRACT

Techniques are disclosed for encrypting internet-of-things (IoT) data of an IoT network only once at its inception until its final consumption without intervening encryption/decryption stages/cycles. The present encrypt-decrypt-once design thus eliminates potential exposure of the IoT data in its plaintext form of a traditional approach employing intervening encryption/decryption cycles. The present design is also efficient and reduces the burden on IoT resources by eliminating the need for encrypting and decrypting the data multiple times. To accomplish these objectives, a number of schemes for device enrollment, authentication, key distribution, key derivation, encryption and encoding are disclosed. The devices employ authenticated encryption because it provides confidentiality, integrity, and authenticity assurances on the encrypted data. The final consumption of the IoT data may be at a designated gateway or a corporate system.

19 Claims, 9 Drawing Sheets

(56) References Cited

U.S. PATENT DOCUMENTS

| | | | |
|---|---|---|---|
| 2017/0192414 A1 | 7/2017 | Mukkamala et al. | |
| 2017/0302669 A1 | 10/2017 | Chen et al. | |
| 2018/0041490 A1 | 2/2018 | Hampel et al. | |
| 2018/0075262 A1 | 3/2018 | Auh | |
| 2018/0097777 A1* | 4/2018 | Li | H04W 12/06 |
| 2018/0131765 A1 | 5/2018 | Puleston et al. | |
| 2018/0160358 A1 | 6/2018 | Nenner et al. | |
| 2018/0310176 A1* | 10/2018 | Abdelhakim | H04L 63/104 |
| 2018/0343127 A1* | 11/2018 | Campagna | H04L 9/0825 |
| 2019/0014104 A1* | 1/2019 | Brands | H04L 63/061 |
| 2019/0220721 A1* | 7/2019 | Chhabra | G06F 21/85 |
| 2020/0059357 A1* | 2/2020 | Fries | H04L 9/0861 |

OTHER PUBLICATIONS

Abdmeziem et al, "A Decentralized Batch-based Group Key Management Protocol for Mobile Internet of Things (DBGK)", 2015 IEEE International Conference on Computer and Information Technology, Oct. 26-28, 2015, pp. 1109-1117, IEEE, Liverpool, UK.

AWS, "Device Provisioning", Amazon Web Services (AWS) (https://docs.aws.amazon.com/iot/latest/developerguide/iot-provision.html), May 23, 2019, Seattle, WA, USA.

AWS, "What is AWS IoT?", Amazon Web Services (AWS) (https://docs.aws.amazon.com/iot/latest/developerguide/what-is-aws-iot-html). May 23, 2019, Seattle, WA, USA.

Azure, "Provisioning devices with Azure IoT Hub Device Provisioning Service", Microsoft (https://docs.microsoft.com/en-us/azure/iot-dps/about-iot-dps), Apr. 3, 2019, Redmond, WA, USA.

Cyphre Secure IoT, "New Security Solutions for IoT Devices", Cyphre (https://www.cyphre.com/cyphre-secure-iot), May 23, 2019, Austin, TX, USA.

HIVE MQ, "MQTT Security Fundamentals: MQTT Payload Encryption", HIVEMQ (https://www.hivemq.com/blog/mqtt-security-fundamentals-payload-encryption), Jun. 1, 2015, Landshut, Bavaria, Germany.

mqtt.org, "MQTT v5.0 now an official OASIS standard", mqtt.org (http://mqtt.org), Apr. 3, 2019, USA.

Ralambotiana, "Key management with a trusted third party using LoRaWAN protocol", Thesis, KTH Royal Institute of Technology, Jan. 1, 2017, KTH Royal Institute of Technology, Stockhom, Sweden.

Pandya et al, "Enhancement of Security in IoTSys Framework", Proceedings of International Conference on Communication and Networks, Apr. 8, 2017, pp. 31-43, Springer Link, Singapore.

Perez, "Efficient Key Generation and Distribution on Wireless Sensor Networks", Master's thesis, KTH Royal Institute of Technology, Feb. 1, 2013, KTH Royal Institute of Technology, Stockhom, Sweden.

Raza, "Lightweight Security Solutions for the Internet of Things", Doctoral Thesis, Dept of Computer Science and Engineering, Malardalen University, Jun. 1, 2013, Sweden.

Stenquist_et_al, "Device Security for the IIOT", White paper, Renesas (https://www.avnet.com/wps/wcm/myconnect/onesite/5c44f792-fb07-4b85-adf8-8f6a1a0e1632/White+paper_Device+Security+for+the+IIoT.PDF?MOD=AJPERES&id=1489609404879), Jul. 1, 2016, CA, USA.

* cited by examiner

EFFICIENT INTERNET-OF-THINGS (IOT) DATA ENCRYPTION/DECRYPTION

FIELD OF THE INVENTION

This invention relates generally to the field of cybersecurity and specifically to securing internet-of-things (IoT) data at all stages of the IoT architecture.

BACKGROUND ART

The evolution of internet-of-things (IoT) in substantially the last decade has brought together devices and technologies that promise to connect virtually all aspects of life. The IoT is a network of devices, sensors, controls, appliances, vehicles, objects or literally any "things" to connect, interact and exchange data. These things or devices have either already or now fast proliferating all industries and aspects of human society. They are installed at homes as well as industrial sites of all kinds (terrestrial or extra-terrestrial), transportation routes, moving vehicles to name a few—either standalone or integrated with other domestic or industrial assets. One estimate forecasts the number of such devices in the world to be over 200 billion by the year 2020.

These IoT devices are meant to be pervasive, usually manifesting in physically small form-factors and oftentimes with inexpensive price tags. As such, it is impractical to physically guard or protect all of such endpoint devices in a given environment or to "harden" them at the hardware level. Furthermore, the IoT data generated by such devices goes through many cycles of encryption decryption from the point of its inception at the devices to the point of its final consumption either at a gateway or a corporate system.

Most often, the communication between the gateway and the corporate key manager is encrypted while in-transit on the network using one of the many available technologies. There are also techniques for encrypting data while at-rest on the gateway devices. However, data is still in the clear and open to attack between in-transit and at-rest. In particular, the data in the prevailing art is in the clear after its arrival and decryption at the gateway and its encryption for storage or further transmission at the gateway. A key innovation of the present design is thus to secure and encrypt the data at all the stages of IoT environments or sites.

At a general level, there are plenty of prior art teachings providing security solutions for the IoT. U.S. Patent Publication No. 2017/0192414 A1 to Mukkamala et al. describes systems and methods that are configured for managing industrial assets. In one example, information about industrial assets or their use conditions, such as gathered from sensors embedded at or near industrial machines or assets themselves can be aggregated, analyzed, and processed in software residing locally or remotely from the assets. In another example, applications can be provided to optimize an industrial asset for operation in a business context. In another example, a cloud-based asset management platform can include development tools to facilitate development by end-users of applications for interfacing with and optimizing industrial assets, and for managing relationships between various industrial assets.

U.S. Patent Publication No. 2017/0302669 A1 to Chen et al. teaches a mobile device having first and second communication interfaces. The device may receive from another device a dispatch message to receive data from an IoT device. Based on the dispatch message, the mobile device may send to the other device a device key. The mobile device may receive from the other device a session ticket generated by the other device. The IoT device may have previously received a copy of the session ticket. The mobile device may send the session ticket to the IoT device and receive data from the IoT device via the first communication interface based on matching the copy of the session ticket. The mobile device may format the data for transmission via the second communication interface. The mobile device may also send via the second communication interface the data to a network device.

U.S. Patent Publication No. 2016/0205106 A1 to Yacoub et al. discloses a method for subscribing to a data feed from an IoT device. The method comprises obtaining using a subscribe application program interface (API) of a container, a subscription request to subscribe to the data feed from a requestor. The container is operable to provide one or more services to the IoT device through one or more APIs. The subscription request is associated with data stored in one or more domain name system records determining that the subscription request is permissible based on a list of approved requestors. The container then provides the data feed to the requestor, such that the requestor may be another container or another IoT device.

Non-patent literature (NPL) doctoral thesis entitled "Lightweight Security Solutions for the Internet of Things" by Shahid Raza of Malardalen University, Vasteras, Sweden dated June, 2013 argues that the future internet will be an IPv6 network interconnecting traditional computers and a large number of smart objects or networks such as Wireless Sensor Networks (WSNs). According to the thesis, the IoT requires multi-faceted security solutions where the communication is secured with confidentiality, integrity, and authentication services. Using standardized mechanisms, communication in the IoT can be secured at different layers: at the link layer with IEEE 802.15.4 security, at the network layer with IP security (IPsec), and at the transport layer with Datagram Transport Layer Security (DTLS).

According to the thesis, even when the IoT is secured with encryption and authentication, sensor nodes are exposed to wireless attacks both from inside the WSN and from the internet. Hence an Intrusion Detection System (IDS) and firewalls are needed. Since the nodes inside WSNs can be captured and cloned, protection of stored data is also important. The thesis purportedly has three main contributions. First, it discusses the pros and cons of secure communication strategies in the IoT using lightweight compressed yet standard compliant IPsec, DTLS, and IEEE 802.15.4 link layer security. Second, it presents the design, implementation, and evaluation of a novel IDS for the IoT. Third, the thesis provides experimental evaluation of the different solutions for securing resource-constrained devices in the IoT using IPsec, DTLS, and 802.15.4 security.

NPL reference "A Decentralized Batch-based Group Key Management Protocol for Mobile Internet of Things (DBGK)" by Abdmeziem et. al of University of Sciences and Technology, Houari Boumedienne, Algiers, Algeria dated October 2015, argues that constrained devices in the IoT will often operate in groups to achieve collective monitoring or management tasks. For sensitive and mission-critical sensing tasks, securing multicast applications is therefore highly desirable. According to the reference, for secure group communications, several group key management protocols have been introduced. However, the majority of the proposed solutions are not adapted to the IoT and its strong processing, storage, and energy constraints. In this context, the reference introduces a novel decentralized and batch-based group key management protocol to secure multicast communications. Their protocol reduces the rekeying overhead triggered by membership changes in dynamic and mobile groups and guarantees both backward and forward secrecy.

NPL master's project thesis "Efficient Key Generation and Distribution on Wireless Sensor Networks" by Victor Perez of KTH Electrical Engineering, Stockholm, Sweden dated February 2013 teaches that the introduction of IPv6 has broadened the address space available and IEEE802.15.4 and adaption layers such as 6loWPAN allow the intercommunication of small devices. These networks are useful in many scenarios such as civil monitoring, mining, battlefield operations, as well as consumer products. Hence, practical security solutions for the intercommunication must be provided, ensuring privacy, authenticity, integrity and data freshness. In most cases, WSN nodes are not tamper-proof and have very limited available resources and capabilities, which makes public key infrastructure (PKI) unattractive for this environment. At the same time, key pre-distribution provides too low security for most applications. Therefore, the communication bootstrapping or the key generation and distribution problem is an important concern to be addressed with the additional difficulty of the constrained capabilities of WSN nodes.

In the thesis, a solution to this problem is described. It makes use of Elliptic-curve Diffie-Hellman (ECDH) protocol with curve K-163 for key exchange, AES-CCM-128 for symmetric encryption for lowering the processing overhead and a partial challenge solving chain. Several hash functions were purportedly analyzed as well as several random number generating approaches reviewed. At the same time, in order to fit the key generation and distribution algorithms together with the regular sensor operation, code optimizations were purportedly carried out on the cryptographic library Relic-Toolkit. This resulted in reducing the memory footprint to 4 KB. Code reductions on Contiki OS allowed it to run using only 18 KB of flash and the peripheral drivers developed for the CC430 reduced the computation time as well. The solution allowed generating and distributing keys in-situ. The solution has purportedly proved to be resilient to most adversaries while taking into account scalability, portability, energy consumption, thus making it suitable for consumer applications.

Other industry solutions relevant to the IoT space include Cypher, MQTT and AWS IoT. Cypher provides IoT data encryption but only on its own servers on its network. It requires IoT devices to interact with its servers. MQTT stands for message queuing telemetry transport and is a machine-to-machine/IoT connectivity protocol. It was designed as an extremely lightweight publish/subscribe messaging transport. It is useful for connections with remote locations where a small code footprint is required and/or network bandwidth is at a premium. Amazon web services (AWS) IoT provides secure, bi-directional communication between Internet-connected devices such as sensors, actuators, embedded micro-controllers, or smart appliances and the AWS Cloud. It uses X.509 to authorize edge devices and MQTT for communication.

However, in view of both patent and non-patent literature teachings, a key short-coming observed in the prior art is that it does not describe techniques for encrypting IoT data only once and keeping it secure at all the stages of its lifecycle. As a result, while the data is in-between IoT stages or between in-transit and at-rest, it is in the clear and open to attacks. What is absent from the prevailing art is the ability to encrypt IoT data only once and keep it encrypted throughout the IoT environment until its consumption at a target application. Such a technology absent from the prior art would also provide for an efficient means of securing/encrypting IoT data without costly intervening encryption/decryption at the various stages/layers of the IoT architecture.

OBJECTS OF THE INVENTION

In view of the shortcomings of the prior art, it is an object of the invention to provide systems and methods for encrypting and decrypting IoT data only once on an IoT network of an IoT environment or site. Such systems and methods would prevent exposure of IoT data in its plaintext form during encryption/decryption cycles of the prevailing art and also reduce computational burden on the infrastructure.

It is also an object of the invention to provide for a public key certificate-based scheme for enrolling and authenticating devices on the above IoT network.

It is further an object of the invention to provide for a salted challenge response authentication mechanism (SCRAM) protocol for authenticating devices with a key server.

It is further an object of the invention to provide for a public key certificate-based scheme for distribution exchanged data keys (EDKs) between the devices and the gateway(s) of the above IoT network.

It is also an object of the invention to provide for a DiffieHellman key-exchange method for distributing EDKs between the devices and the gateway(s) of the above IoT network.

It is still another object of the invention to provide for authenticated encryption and decryption of IoT data on the IoT network.

It is yet another object of the invention to provide for a type length value (TLV) scheme for encoding encrypted data transmitted on the on the IoT network.

Still other objects and advantages of the invention will become apparent upon reading the summary and the detailed description in conjunction with the drawing figures.

SUMMARY OF THE INVENTION

A number of objects and advantages of the invention are achieved by apparatus and methods designed for securing data of an internet-of-things (IoT) network at an IoT site. The present techniques provide for encrypting IoT data at its inception at the IoT devices only once and then keeping it encrypted and secured throughout the various stages of its lifecycle until its final consumption.

The IoT data in-transit on the IoT network between the various nodes may be encrypted and the data at-rest stored locally on the gateways may be encrypted. However, it is in between its transmission and local storage that it goes through decryption/encryption cycles/stages and is in the clear, and is thus open to potential attacks in the prevailing art.

The present design avoids such an exposure of IoT data in its plaintext or clear form and is referred to as encrypt-decrypt-once technology. It does so by encrypting the IoT data only once throughout its lifecycle and thereby preventing its decryption to plaintext until its final consumption. Moreover, the present design also provides technological efficiencies by reducing the computational burden on the IoT infrastructure and resources by eliminating resource-intensive multiple encryption/decryption cycles.

According to the present teachings, the IoT network at the IoT site employs a number of IoT devices or IoT edge devices or endpoints or simply devices that generate IoT data according to their respective functions. There are also one or more gateway devices or simply gateways on the network that are responsible for sending commands to the devices and collecting their IoT data from the network.

The edge devices are first enrolled on the IoT network by a certificate authority that issues public key (PK) certificates or digital certificates to the devices. There is also a provisioning server that is in charge of performing provisioning tasks. These include authenticating the devices on the network and then configuring them according to the requirements of the IoT site. Depending on the requirements of the IoT site, the edge devices may be provisioned to send their data only to a designated gateway or a set of designated gateways.

In one embodiment, once a device is enrolled, it sends its digital certificate to the provisioning/authentication server for authentication. The provisioning/authentication server performs a number of authentication checks on the certificate. If the checks pass, the device is authenticated. At this point, the provisioning server provisions or configures the device as needed. Such a configuration may include providing the device with the IP address of the gateway(s) designated for the device.

In another embodiment, the devices come pre-installed with a public-private keypair or a digital certificate that is used to authenticate the devices on the IoT network. The authentication may be performed by a provisioning/authentication server and/or a key server. The key server is in charge of distributing exchanged data keys (EDKs) or the wrapping keys to the devices from which they derive their data encryption keys (DEKs) for encrypting their IoT data.

In a related embodiment, the edge devices and the key server utilize a salted challenge response authentication mechanism (SCRAM) protocol for the authentication of the devices. In yet another embodiment, the authentication mechanism of the underlying communication protocol operating on the IoT network is employed for authenticating the IoT devices on the network.

The distribution and availability of encryption keys for the devices can be accomplished using one or more of number of schemes afforded by the present design. In one embodiment, once a device has been authenticated on the IoT network the key server issues an EDK to the device. The EDK may be a hash-based message authentication code (HMAC) utilizing an HMAC generating secret key.

Once the devices have obtained their EDK, they can derive their DEK from the EDK and using which they can encrypt their IoT data for transmission to their designated gateway or gateways. Therefore, it is essential that the gateway also has a mechanism for recovering the same original DEK that was used by the device to encrypt its IoT data. This is so that the gateway may decrypt the received encrypted IoT data as and when needed for its consumption.

For this purpose, in one embodiment, the gateway first broadcasts its PK certificate issued by the certificate authority to all the devices. The devices thus obtain the public key of the gateway from the certificate and encrypt their EDK with the gateway's public key to obtain a wrapped EDK. They then periodically send the wrapped EDK to the gateway which is then able to decrypt the wrapped EDK with its private key. The gateway is then able to derive the same DEK from the EDK that was used to encrypt the data, and is thus able to decrypt it.

In another embodiment, the devices and the gateway first establish a shared secret using a DiffieHellman (DH) key-exchange method. For this purpose, the shared secret may be initially created on the network using an introduction process. Once the shared secret is established, both the gateway and the devices can derive it without revealing it on the communication channel. Therefore, in this embodiment, the devices encrypt/wrap their EDK with the shared secret/key and send it periodically to the gateway, which is then able to decrypt it with the same shared secret/key to recover the original DEK for decrypting the data.

In yet another key distribution scheme disclosed by the present teachings, the devices are not issued an EDK by the key server. Instead, the gateway requests the key server to generate a symmetric per-device wrapping key. Once obtained by the gateway, it then sends the wrapping keys to the respective devices, along with their respective device IDs. The devices then apply a key derivation function (KDF) based on the wrapping key, device ID and a counter value to derive a per-message DEK. They then encrypt individual IoT messages with the corresponding per-message DEK to send the encrypted/ciphertext IoT messages to the gateway along with the device ID and counter values in plaintext form.

The gateway once in possession of the encrypted message from a given device, calls the key server to obtain the same per-device symmetric wrapping key. Using the wrapping key and the device ID and the counter value received in the message it applies the same KDF to arrive at the original per-device DEK used by the device, and is thus able to decrypt the message.

In the embodiments employing an EDK per above, a salt is used by the devices to derive the DEK. More specifically, a hash-based KDF (HKDF) is used by the devices employing the EDK and the salt value to arrive at the DEK. The salt may be a random number generated by the device at the time of the derivation of the DEK and is then sent by the device in unencrypted/plaintext form along with the encrypted message to the gateway. The gateway is thus able to apply the same HKDF, EDK and salt value to recover the original DEK of the device.

The present technology employs authenticated encryption because such an encryption simultaneously provides confidentiality, integrity, and authenticity assurances on the data being encrypted. Preferably, the authenticated encryption regime employs an advanced encryption standard (AES) in Galois/counter mode (GCM) mode of encryption. The advantages of such a GCM mode of symmetric key cryptographic ciphers include high efficiency and performance.

The encryption and transmission of IoT data takes place in messages. The devices perform above authentication encryption on the messages to arrive at encrypted IoT messages for transmission to the gateway or any other recipient system/device local or remote. As needed, the devices may also store the IoT data locally in its ciphertext/encrypted form before its transmission. The authentication encryption utilizes the DEK and an initialization vector or a counter value and additional authenticated data (AAD) to arrive at the ciphertext/encrypted message and an authentication tag. Then at the gateway, authenticated decryption only succeeds if the inputs are authentic and fails otherwise.

The AAD and authentication tag comprise the metadata of the message that is encoded using a type length value (TLV) encoding and then sent unencrypted with each transmitted encrypted IoT message. Thus, each encrypted IoT message consists of the metadata, that is, AAD and authentication tag and the encrypted/ciphertext message. The AAD consists of a secure hash algorithm-256 (Sha-256) or a like hash over fields: protocol version (PVer), sender ID (SID), key ID (KID), the salt value above and the counter value. The gateway/recipient is thus able to obtain the above inputs for applying authenticated decryption to decrypt the ciphertext of the encrypted IoT message.

Based on the encrypt-decrypt-once techniques provided herein, the IoT data is encrypted only once at its inception, that is, right after its generation by the IoT devices and on the IoT devices themselves. It then stays encrypted until its transmission and arrival the gateway/recipient for final consumption or storage.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
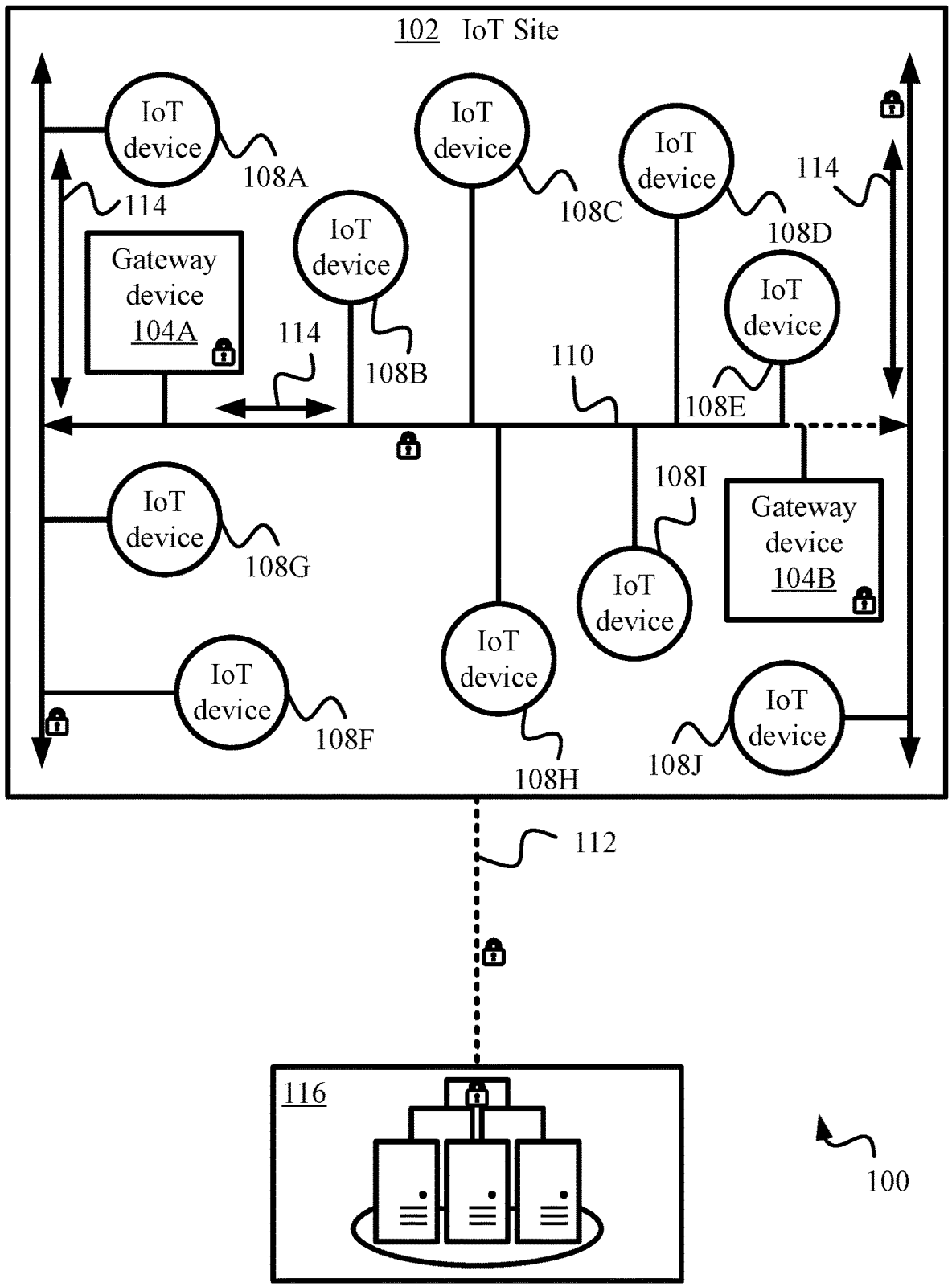
FIG. 1 illustrates in a block diagram form the various components of a secure IoT network according to the present technology.

The present invention will be best understood by first reviewing systems and methods for securing data-at-rest in a secure IoT environment as illustrated in FIG. 1. Embodiment 100 of FIG. 1 shows an internet of things or internet-of-things (IoT) site or environment 102 that contains a variety of IoT devices or endpoints or edge devices 108. Any number of IoT edge devices 108A, 108B, . . . are permitted at site 102. Their number may be in the dozens, hundreds, thousands or even more depending on the implementation. There are also a number of IoT gateway devices 104. Any number of such IoT gateway devices, or simply gateway devices, or even more simply gateways are possible. Two such gateways 104A and 104B are explicitly shown in FIG. 1.

IoT environment or site 102 can be practically any environment or location or site, stationary or moving, terrestrial or extra-terrestrial, where IoT devices 108 are deployed. Exemplarily, site 102 can be an oilrig where IoT devices/sensors 108 are used to monitor the various operational parameters of the rig. For example, devices/sensors 108 may be measuring tank liquid levels, loads on winches, pressures on the drill-bit, torque on the top drive, etc. IoT site/environment may alternatively be an embassy and devices/sensors 108 may be various security devices, such as surveillance cameras, fence monitors, intrusion detectors, etc. Site 102 may alternatively be virtually any other site and sensors 108 may be deployed to monitor various aspects of the systems deployed there.

Environment 102 may also be a medical facility, such as a hospital, and devices/sensors 108 may be various types of medical and infrastructure sensors, such as pressure, temperature and flow sensors installed on anesthesia delivery machines, respiratory monitoring and blood pressure monitoring equipment, ventilators oxygen concentrators, sleep apnea machines, blood analyzers ventilators, kidney dialysis machines, infusion and insulin pumps, organ transplant system temperature monitoring and control, neonatal intensive care units, blood analyzers, hospital beds, surgical fluid management systems, and pressure-operated dental instruments, gas mixing, and electro-surgery. Devices/endpoints/sensors 108 may also be image sensors deployed equipment related to radiography, minimally invasive surgery, fluoroscopy, cardiology, mammography, dental imaging, endoscopy, external observation, laboratory equipment, ocular surgery and observation, and artificial retinas, etc. Sensors 108 may also be accelerometers and biosensors deployed according to their medical applications.

IoT site 102 may also be any other site of scientific exploration such as polar and ocean exploration expeditions and space missions. Site 102 may also be a moving vehicle, such as a truck driving to a site to drop off or pick up goods, or a train, a car, a bus, a plane, a rocket, etc. Above is only a handful of examples of IoT site/environment 102 of the embodiment shown in FIG. 1, and the present technology admits to almost endless possibilities for site 102 and sensors 108 for its various implementations. As noted, the IoT sites, such as site/environment 102 may contain hundreds, or thousands or more IoT sensors devices 108.

FIG. 1 also shows a communication network 112 connecting site 102 to a backend corporate data center 116. Communication network 112 is a Wide Area Network (WAN) like the internet or the "cloud" or a Metropolitan Area Network (MAN) with physical connections supported by any combinations and variety of communications infrastructure including wired, optical and wireless. Corporate data center 116 contains various kinds of computing resources or servers required by the corporation.

Gateways 104 are responsible for sending commands to edge devices 108 as well as collecting, aggregating, collating, tallying or in any way, shape or form processing IoT data 114 generated by these devices at site 102. Either in response to the commands sent by the gateways, or automatically without any such explicit commands, the edge devices perform their intended functions that result in the generation of IoT data 114. They then transmit this IoT data to gateways 104 for aggregation/processing. Ultimately, gateways 104 may further report the aggregated/processed IoT data 114 to corporate data center 116. More specifically, they typically report the data to an appropriate target back-end server(s) (not shown in FIG. 1) at data center 116.

IoT data 114 is collected via a local area network 110 at site 102 of which all IoT devices 108 and gateways 104 are members. Local area network 110 may be implemented using one of a number of techniques available in the art. As shown by the lock symbols in FIG. 1, IoT data 114 is usually transmitted/communicated within site 102 and to/from corporate data center 116 in a secure manner, taking advantage of one of a number of available technologies of the art for securing data in-transit. Such techniques include secure socket layer (SSL)/transport layer security (TLS), IPSec, etc. Similarly, and as shown by the lock symbols, data-at-rest residing in the storage space/media of gateway devices 104A, 104B may also be secured as taught in commonly owned U.S. patent application Ser. No. 16/359,964 filed on 20 Mar. 2019.

One of the advantages of the present encrypt-decrypt-once design is that it obviates the need for SSL/TLS. This is because it provides end-to-end encryption for the entire lifecycle of IoT data without superfluous and expensive intermediate encryption/decryption cycles. However, if SSL/TLS security already exists at an IoT infrastructure, the present solutions can easily co-exist with such technologies. Explained further, in such an environment, data encrypted by IoT devices according to present embodiments, will be re-encrypted/decrypted by SSL/TLS for communication between various nodes on network 110.

However, during the various stages of its lifecycle in an IoT architecture, such as in between its transmission and local storage, IoT data 114 may be decrypted, re-encrypted, and decrypted a number of times. After decryption, and before re-encryption, IoT data 114 is in plaintext form and open to an attack. More specifically, IoT data 114 of FIG. 1 may be encrypted during its transmission from an edge IoT device such as device 108B to gateway 104A. However, once it arrives at gateway 104A, it would be decrypted and re-encrypted for processing and/or storage on gateway 104A. Similarly, the data may be re-encrypted before its transmission over network 112 to corporate data center 116, where it may be decrypted and re-encrypted again. Alternatively, the data may be processed at gateway 104A and then sent to corporate data center 116. During each of such decryption and encryption cycles/stages, IoT data 114 is exposed as a target for a data hack/theft/attempt/attack.

What is needed is a way to encrypt IoT data 114 once at its inception on an edge device or at an endpoint, such as device 104B and then keep it encrypted until decryption for its final consumption. The final consumption may be at gateway 104A or corporate data center 116 or any other recipient system/device or point of interest. This is one of the key benefits provided by the instant design. The instant technology not only protects the data by preventing its exposure during various decryption/encryption stages but is also efficient as a result of reducing the computation burden on the architecture by encrypting the data only once and keeping it encrypted until its final consumption.

Let us now look in greater detail at how the instant design accomplishes its "encrypt-decrypt-once" objectives. As shown in the block diagram of a preferred embodiment 200 of FIG. 2, there is a provisioning/authentication module or server 202 and a key manager module or server 204. Provisioning/authentication module/server 202 is responsible for authentication and provisioning of devices on network 110. Let us now look at the functionality of this module/server in greater detail.

Provisioning/Authentication

IoT device provisioning consists of the following key functions performed by module 202.
Provisioning Tasks:
1. Authenticating each device and establishing its initial connection on network 110.
2. Applying proper configuration to the device based on the specific requirements of IoT site 102.

Figure 2:
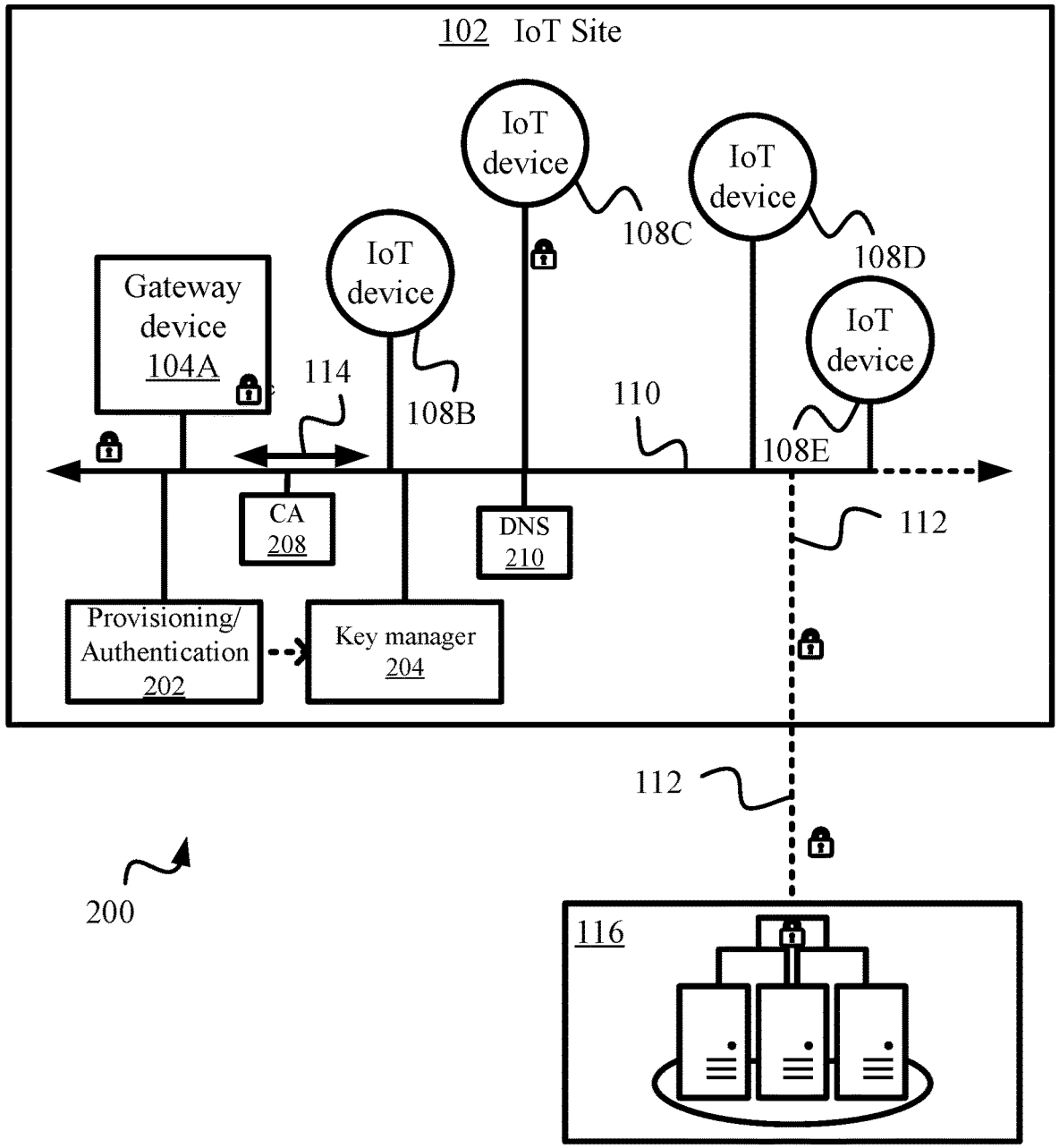
FIG. 2 shows additional modules/servers on the IoT network of FIG. 1 to delineate various embodiments of the present design.

As noted, the above tasks are performed by provisioning server 202. Per task (1) above, a new device must be authenticated on network 110 before its connection to the network can be established. As such, sometimes provisioning server 202 may also be referred to as a provisioning and authentication or provisioning/authentication server 202. In alternative embodiments, task (1) above may be performed by a dedicated authentication server while only task (2) is performed by the provisioning server. Referring still to FIG. 2, key manager module/server or simply key server 204 is responsible for allocating and distributing keys to the participating devices on network 110.

Figure 3:
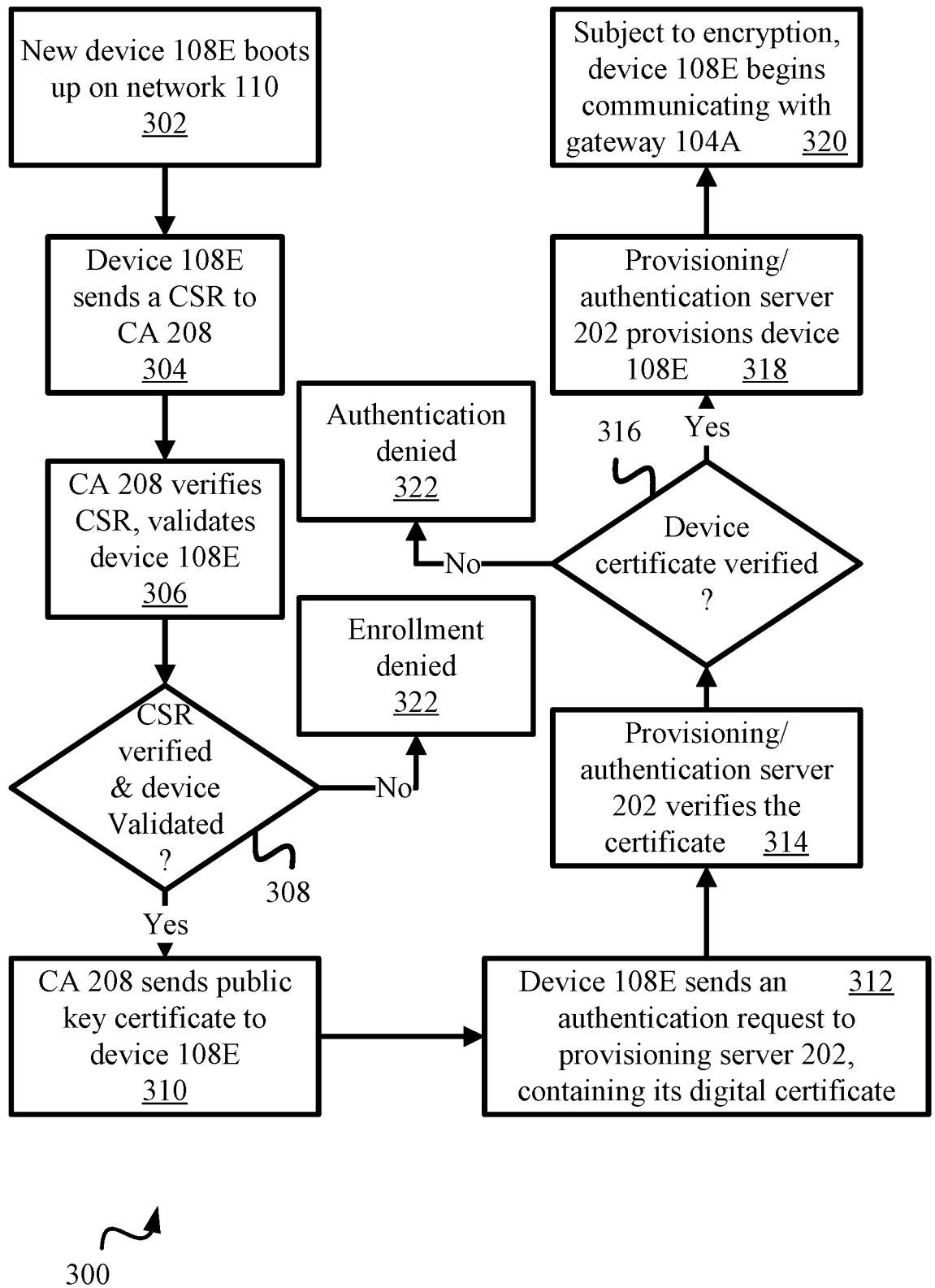
FIG. 3 shows the various elements and steps behind the enrollment and authentication of devices at an IoT network according to the instant principles.

FIG. 2 shows various edge devices 108B-E of FIG. 1 on network 110 on which IoT data 114 is being transmitted. Not all the devices and their reference numerals from FIG. 1 are shown in FIG. 3 for reasons of clarity. Now, starting from the beginning, let us see what happens when we add a new device to network 110.

New devices are added to IoT network 110 via a provisioning process carried out by provisioning server 202. Provisioning of new devices consists of tasks (1) and (2) as noted above. Task (1) which consists of the process of authentication ensures that the new IoT devices on network 110 are legitimate participants of the network. More specifically, the authentication process consists of ascertaining that a device is what it says it is. Those devices whose credentials are verified on network 110 are authenticated and all other devices are rejected or denied. Ultimately, authentication is needed to have a consistent and unforgeable way to identify the edge devices.

Task (2) consists of properly configuring the new devices on network 110 according to the requirements of IoT site 102. One such requirement may be that each new device sends its IoT data 114 to one or more designated gateways. For instance, if the new device being added is edge device 108E, then the requirements of IoT site 102 may dictate that device 108E be configured to send its IoT data to gateway 104A shown in FIG. 2.

Let us now look at task (1) and (2) of provisioning performed by our provisioning/authentication server 202 shown in FIG. 2 in even greater detail. In the preferred embodiment, a certificate authority (CA) 208 shown in FIG. 2 is used to generate credentials for the IoT devices per below explanation. This process of obtaining credentials/certificates by the devices is also referred to as enrollment according to the present design. After the credentials have been obtained by our new device 108E, or in other words, after the new device has been enrolled, it can then authenticate itself with provisioning server 202 as provisioning task (1) above.

Provisioning server 202 can then provision the device as per task (2) above, after which it can start communicating with its dedicated gateway 104A. The present design thus allows for auto-provisioning or "provision on connect" for new devices at IoT site 102 because no manual intervention is required for authentication/provisioning of new device.

In the preferred embodiment, each new edge device is pre-configured to include a public-private keypair associated with public key infrastructure (PKI) technology, and the fully qualified domain name (FQDN) of CA 208 on network 110 at the time of its manufacturing. When a new device, such as device 108E first boots up on network 110, it sends a certificate/code signing request (CSR) to CA 208. More specifically, it first uses a Domain Name System (DNS) to obtain the IP address of the CA on network 110 based on the FQDN of CA 208 and then sends it the CSR.

Further explained, CA 208 has a public key that is pre-known to all the devices on network 110. This knowledge in the devices on network 110 may be provided by an introduction process to be further explained below, or may be embedded in the devices and more specifically in their trusted stores at the time of their manufacturing. In any case, CA 208 also has its corresponding private key that no other device knows. When creating the CSR, our new edge device 108E includes its public key in it along with its identity information. Using its private key, it then signs the CSR, more specifically its identity information in the CSR. In one embodiment, its identity information in the CSR is its Media Access Control (MAC) address. In alternative embodiments, its identity information is its FQDN on network 110.

Upon receiving the CSR, CA 208 first ensures the authenticity of the CSR by verifying its signature using the public key of the device received in the CSR. Once the CSR is verified, CA 208 then validates edge device 108E to ensure that it is what it says it is. In other words, it validates the identity information of the device obtained in the CSR. For this purpose, it ensures that the MAC address or FQDN of the device in the CSR is indeed the MAC/FQDN of device 108E. If the identity information is a MAC address, as in one embodiment, then CA 208 consults a database containing valid MAC addresses of edge devices that are allowed to participate on network 110.

If the identity information of edge device 108E is an FQDN, as in another embodiment, then CA 208 consults DNS 210 shown in FIG. 2. DNS 210 keeps a table of IP addresses and the FQDNs of devices on network 110 that are allowed to participate at IoT site 102. Specifically, it stores each FQDN or a host name on network 110 and the corresponding IP address that the name "points to" in an address record or an A record. It holds such A records for as many or a range of IP addresses that are allowed for edge devices 108 on network 110. Therefore, when CA 208 validates the IP address of edge device 108E in the above example, it looks up the IP address in DNS 210. DNS 210 can verify that the IP address is indeed an allowable IP address on network 110. Moreover, it can also verify that the IP address is not already used by another edge device. For this purpose, CA 208 may issue a command such as "nslookup" on DNS 210.

Once the validation of our new edge device 108E has been performed by CA 208, it can then issue the proper credentials to the device. For this purpose, in one embodiment, it would take the public key of edge device 108E that it received in the CSR along with the validation information of the device, such as its MAC or IP address, collectively in a credentials document known as the public key certificate of the device. It also includes the IP address of provisioning server 202 on network 110 in the certificate. CA 208 then digitally signs the public key certificate with its private key to obtain a digitally signed certificate for our newly enrolled edge device 108E. CA 208 then sends this certificate to edge device 108E which can now verify the authenticity of the certificate by decrypting it with the public key of CA 208. As noted, this process of obtaining credentials or digital certificates by the devices from CA 208 is also referred to herein as enrollment.

In related embodiments, the public key certificate or digital certificate for device 108E explained above follows the X.509 standard. In still related variations, such a certificate may also be included in the device at the time of its manufacturing. Regardless, once edge device 108E has its certificate/credentials, it can now contact provisioning server 202 with an authentication request and whose IP address it obtained in the certificate. The authentication request contains its digital certificate obtained above. Once provisioning/authentication server 202 receives the certificate and the authentication request, it performs a number of checks on the certificate to ensure that it is valid. For this purpose, it also contacts CA 208. These checks consist of at least the following.

Authentication Checks:
1. Has the digital certificate been issued/signed by a trusted CA, for example, CA 208 on network 110? To answer this question, it verifies the signature of the certificate with the public key of the CA that is stored in its trusted certificates store or simply trusted store.
2. Is the certificate expired? For this purpose, it checks both the start and end dates specified in the certificate.
3. Has the certificate been revoked? For this purpose, it contacts CA 208 to see if the certificate is in a certificate revocation list (CRL). More preferably, it contacts an online certificate status protocol (OCSP) service for this purpose.
4. Has the client provided proof of possession (PoP)? To answer this question, edge device 108E would have encrypted some test data with its private key and included both the plaintext and encrypted test data in the certificate sent to provisioning/authentication server 202. Upon receipt, server 202 decrypts the encrypted data with the public key of the device in the certificate. If the result matches the plaintext data sent by the device, then this is proof that the device is in possession of its private key.

If all the above authentication checks performed by provisioning/authentication server 202 in provisioning task (1) noted above succeed, then the authentication request of our new edge device 108E is accepted. As a result, provisioning server 202 performs provisioning task (2) noted above. For this purpose, it sends the IP address of designated gateway 104A (or other gateways/recipient as needed) with which the device should communicate for commands and IoT data.

The above configuration information to device 108E may be sent in a format suitable for the device. From here onwards, subject to encryption of its IoT data per below teachings, the device can start communicating with its dedicated gateway 104A directly. Furthermore, any other configuration information that may be required by the device at site 102 can also be sent by server 202 as a part of provisioning task (2) as needed.

On the other hand, if any of the above authentication tasks fails, the device is denied authentication by authentication server 202 per provisioning task (1) above. As such, it is also not provided any configuration information by server 202 to operate on network 110 per provisioning task (2) above. For instance, it is not provided with the IP address of the gateway to communicate with. It may even be blocked or sent a shutdown command by provisioning server 202.

Note also that the above-explained authentication would not be successful, if CA 208 could not verify the signature of edge device 108E in its CSR message, or if the CA could not validate the credentials of the edge device or if the edge device could not verify the signature of the CA in its certificate. In one such exemplary case, if there were a fake/malicious device being added to site 102 and specifically to network 110, it would not have the correct private key to sign the CSR that is verified by the CA. In another such exemplary case, if a fake/malicious CA were to issue the public key certificate to the device, it would not possess the correct private key of real CA 208 to sign the certificate. As such, it would not be verifiable by the edge device using the public key of the legitimate CA pre-known to all devices on network 110 per above.

The above processes of enrollment, provisioning and authentication scheme of new devices in the present embodiment is also shown in FIG. 3 in a flow diagram form in conjunction with FIG. 2. Specifically, flow chart 300 of FIG. 3 shows the various steps behind provisioning/authentication tasks (1) and (2) per above explanation. We begin by process/block/box/step 302 representing that a new device, such as edge device 108E first boots up on network 110. Device 108E then creates and sends a certificate signing request (CSR) to CA 208 per above explanation as shown by box 304. CA 208 then verifies the authenticity of the CSR and validates the identity of the device received in the CSR as shown by box 306.

Based on the results of the above, a decision is made by CA 208 whether to proceed forward with enrollment of the new device or not. Specifically, and as shown by decision diamond 308, if the CSR is verified and subsequently the identity of the device is validated, execution proceeds to block 310. This is shown by the arrow labeled Yes out of decision diamond 308. If however, any of the above checks fail, the enrollment is denied to the new device 108E, as shown by process box 322 and arrow labeled No emerging out of diamond 308.

Block 310 represents that upon successful enrollment, CA 208 prepares and sends the public key certificate or simply digital certificate to device 108E. The device then creates an authentication request containing its digital certificate for provisioning/authentication server 202 as shown by block 312. At this point, provisioning/authentication server 202 verifies the digital certificate by performing authentication checks (1) through (4) provided above. This is shown by block 314.

As shown by decision diamond 316, if the authentication checks are successful, then authentication is accepted as shown by arrow labeled Yes out of decision diamond 316. If however, any of the authentication checks fail, then authentication is denied as shown by block 324 and arrow labeled No out of diamond 316. If the authentication is successful, then provisioning/authentication server performs provisioning task (2) noted above and as shown by box 318 in flowchart 300. Per above explanation, provisioning server now configures device 108E by sending it any necessary information as per the requirements of IoT site 102 of FIG. 1-2. This may include IP address of the designated gateway 104A for the device. By utilizing encryption of its IoT data per below teachings, device 108E is now ready to securely communicate with the gateway as shown by block 320.

In addition to edge devices 108, when any other module/device, such as key server 204 is initially connected to network 102, it is also authenticated. This authentication is also performed in conjunction with CA 208 and provisioning/authentication server/module 202 per above explanation. Of course, the exceptions to the above are CA 208 and provisioning/authentication module 202 themselves. These privileged modules/servers need to be installed on network 110 using a physically secure and typically a manual/non-automated process involving authorized personnel.

In related embodiments, the digital certificate obtained by devices 108 above, may also have an expiration date/time after which it expires, subsequent to which the respective device needs to re-enroll with CA 208 and have a new digital certificate issued. Such a variation provides added security to the system by periodically re-issuing fresh certificates to devices that may be present on network 110 for a long time or whose certificates may have gone "stale". The process of re-enrollment with CA 208 and re-authentication of the devices with provisioning/authentication server 202, reconfirms the legitimacy of the devices on network 110. Such a process is analogous to the familiar process of password expiration known to skilled readers.

In still other embodiments, the present technology innovates over existing provisioning techniques such as Microsoft Azure IoT Hub Device Provisioning Service and Amazon AWS IoT Device Provisioning. For details on these services, the reader is referred to the relevant web pages of these services provided by respective vendors. Like the prior embodiments, in the present embodiments also, each device is pre-configured to include a public-private keypair as well as the FQDN of CA 208.

However, the new devices authenticate to key manager/server 204 in addition to or instead of provisioning/authentication server 202. In other words, when a new device, for example, device 108D of FIG. 2, first boots up on network 110, it first obtains its public key certificate from CA 208 as in the prior embodiments. Recall that in the prior embodiments, at this point the device authenticates itself to/with provisioning/authentication server 202. However, in the present embodiment, instead of or in addition to authenticating with provisioning server 202, it creates and sends an authentication request to key server/manager 204 of FIG. 2 introduced earlier.

The process of authenticating with key server 204 is similar to that with provisioning/authentication server 202 explained earlier. In other words, new device 108D sends its public key certificate or digital certificate to key server 204 which verifies it with CA 208 by performing at least authentication checks (1) through (4) presented above. If key server 204 is able to authenticate device 108D then it can now issue an exchanged data key (EDK) from which the device can derive its data key or data encryption key (DEK) for encrypting its IoT data. The encrypted IoT data may be destined for designated gateway 104A or for local storage on device 108D as per the encrypt-decrypt-once design of the present technology. Key distribution and management as well as key derivation, encryption and data encoding will be explained in detail further below.

In still other embodiments, an edge device is authenticated to/with to provisioning server 202 as in the prior embodiments. However, after the device is authenticated, provisioning server 202 issues a per-device key to the authenticated edge device. The edge device can now use this key to authenticate to key server 204 of FIG. 2. It does so by using a salted challenge response authentication mechanism (SCRAM) mechanism/protocol. Those skilled in the art will appreciate that a SCRAM protocol is useful for exchanging keys over a non-secure channel by providing a proof of knowledge or secret between two parties without revealing that secret. Thus, edge device 108D provides its key obtained from provisioning server 202 above in a SCRAM protocol to key server 204 to prove its authenticity.

Let us now see how the SCRAM mechanism is specifically applied to our IoT site 102 of FIG. 2 and the above example in the present embodiment. Device 108D uses its key obtained from provisioning server 202 to compute a hash message authentication code (HMAC) to arrive at its client-key. It uses its client-key to create a client-proof that it sends to key server 204 along with the authentication message/request. Key server 204 authenticates the device by first computing the client-signature from the authentication message and then exclusive-ORing it with the client-proof to recover the client-key.

Key server 204 then verifies the correctness of the client-key by computing the hash of the client-key and comparing the result to the stored-key stored for the device in the key server or its accompanying database. If the client-key is correct, then this proves to the key server that the device is the legitimate owner if its original key (obtained from provisioning server 202). It can now issue an EDK to the device per the key distribution and management schemes presented herein.

In a converse fashion, the device can also verify the authenticity of the key server by computing the server-signature and comparing it to the value received from the key server. If the two are equal, then this proves to the device that the key server had access to the stored-key for the device. For further details of SCRAM mechanism/protocol, the inquisitive reader is referred to RFC 5802 from Internet Engineering Task Force (IETF), ISSN 2070-1721.

Figure 4:
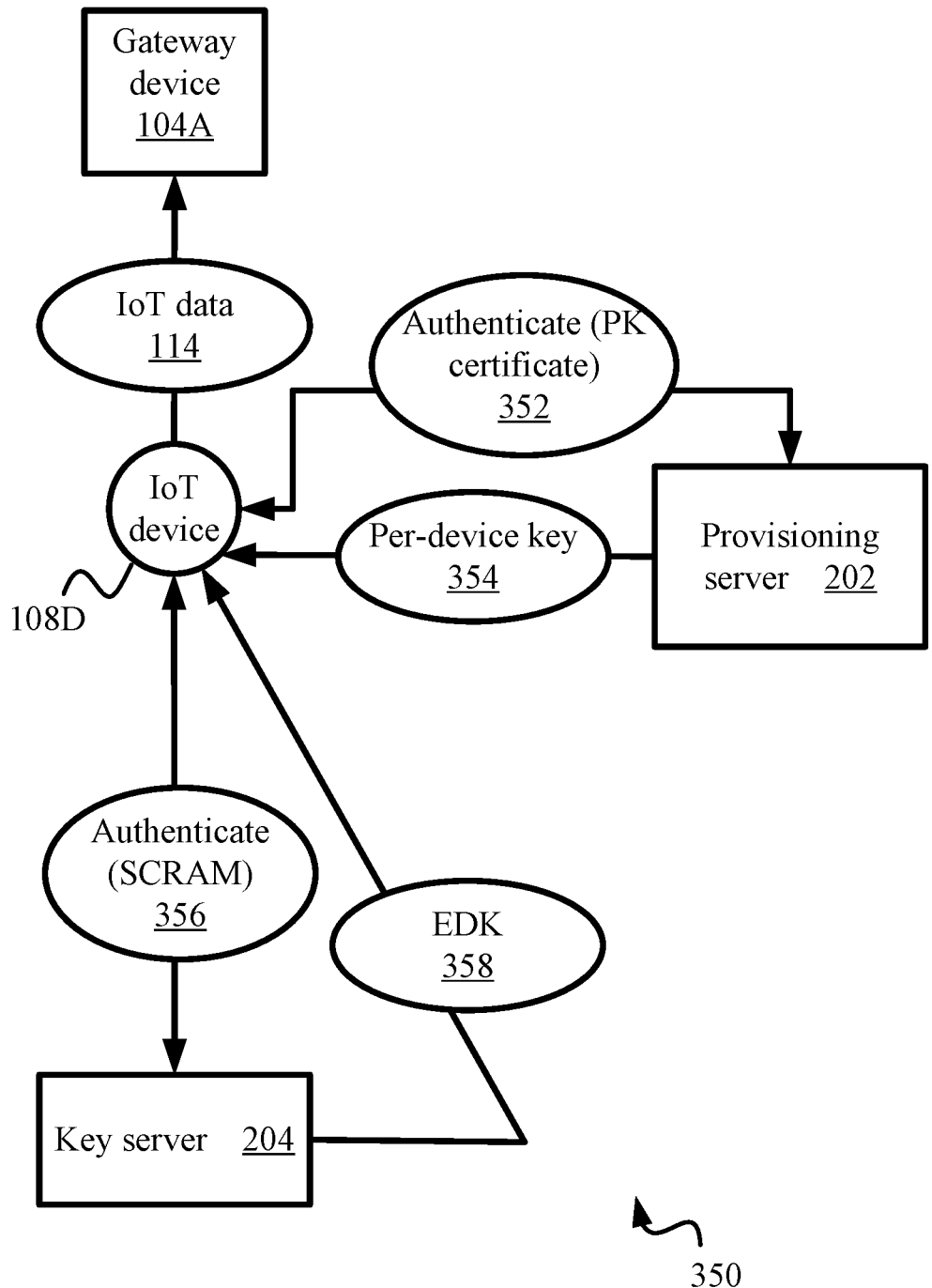
FIG. 4 shows a conceptual diagram of an embodiment employing a salted challenge response authentication mechanism (SCRAM) mechanism/protocol for authentication of the devices with a key server.

FIG. 4 shows the conceptual diagram of present embodiment 350 in a pictorial form. Specifically, new edge device 108D authenticates itself using a public key (PK) certificate with provisioning/authentication server 202 as shown by bubble 352. If the device is authenticated, server 202 sends device 108D a per-device key per above as shown by bubble 354. Device 108D then uses this key in a SCRAM protocol to verify its authenticity with key server 204. This is shown by bubble 356. After such authentication, and as shown by bubble 358, key server 204 can now issue an EDK to device 108D.

From its EDK, the device can derive its DEK for encrypting its IoT data 114 for local storage or transmission to gateway 104A as shown. Like the prior embodiments, the present embodiment also benefits from the encrypt-decrypt-once design of the present technology to encrypt IoT data 114 only once with its DEK while storing it locally or transmitting it to the gateway. The present design thus ensures the security of IoT data throughout the various stages of its lifecycle at IoT site 102 of FIG. 1-2. Note that other elements and reference numerals from drawing figures of prior embodiments and teachings are not shown in FIG. 4 to avoid clutter.

In a variation of the above design, the EDK issued by key server 204 to the edge device is an HMAC itself. More specifically, the key issued is an HMAC computed by key server 204 using an HMAC generating secret key, which may be an identification information of the device such as its device ID. Alternatively, a salting scheme may be employed to ensure uniqueness of the HMAC generating secret key per device or related family of devices. The HMAC may be computed using a secure hashing algorithm such as Secure Hash Algorithm-256 or Sha-256 for short.

The device ID in the present embodiment may be the MAC address of the device or its device number or the like. The advantage of the present scheme is that the HMAC keys for the devices need not be stored in a database by key server 204 and to be provided to the gateways or corporate system(s)/server(s) for decryption of IoT data when needed. This is because they can always be regenerated on demand as long as the HMAC generating secret key are known by the gateways or corporate server(s) for the devices.

The above handshake/communication of messages in-transit in the present embodiments obviates the need for other secure data-in-transit communication mechanisms on network 110. However, the present technology can easily co-exist with such mechanisms at various IoT sites. Examples of such existing techniques include SSL/TLS as noted above. This means that data encrypted by IoT devices with their DEKs per above explanation, will be re-encrypted/decrypted by SSL/TLS for communication between various nodes on network 110.

In still other embodiments, authentication module 202 may authenticate a new device joining network 110 by utilizing the authentication capabilities of underlying communication protocol operating on network 110. For example, if network 110 is a wired LAN, then authentication module 202 may utilize IEEE 802.1 authentication standard already being used on network 110.

Similarly, if network 110 includes a wireless network (Wifi) based on the IEEE 802.11 standard, then module 202 may utilize extensible authentication protocol (EAP) used by Wifi networks. The Wifi network may be over a transport control protocol (TCP) or a user datagram protocol (UDP) layer.

Alternatively, if network 110 is a ZigBee network, then authentication module 202 may utilize the authentication framework/protocol/standard used by ZigBee networks and so. Other potential candidates for the underlying network include message queuing telemetry transport (MQTT), etc. The details of these and other prevailing authentication schemes of potential underlying communication protocols for network 110 are well understood in the art and not delved into detail in this specification.

In still other variations of the above embodiments, the IoT devices do not come pre-installed with a key. Instead, a shared secret is first created between the IoT devices 108 and authentication server/module 202 of FIG. 2 and/or key server 204 in an "introduction" process. The target server/system, whether authentication server/module 202 or key server 204, with which the shared secret is created for the devices, is referred to in such a process as the "access point". The shared secret may take the form a passphrase that may be securely entered or created between the device and the access point utilizing available techniques.

For instance, the passphrase may be a personal identification number (PIN) or a passphrase entered/created on the access point when the device is physically connected to the access point (by a cable) during the introduction. Alternatively, it may be entered/created during introduction at the access point when the device is in the range of short-range short-lived radio network around the access point (such as in a Wifi protected setup (WPS) using a physical/virtual push button). As alluded to earlier, such an introduction process may also be used for allowing the devices on network 110 to acquire the knowledge of the public key of CA 208. In other words, once securely connected to the access point during introduction, the public key of the CA may be entered/transmitted to the devices.

Once the shared secret between the device(s) and the access point on IoT network 110 has been created during introduction, the introduced devices can be authenticated on the network using a SCRAM protocol/mechanism. More specifically, and referring now to FIG. 2 again, new devices can authenticate themselves to provisioning/authentication server 202 and/or key server 204 by proving the possession of the shared secret without revealing the secret per above explanation. As in the other embodiments, after authentication, the devices can proceed to obtaining EDKs from key server/manager 204 per the key management/distribution schemes provided herein. As already noted, from their EDKs the device can derive their respective DEKs for encrypting-once their IoT data on network 110.

Key Management and Distribution

Let us now look in detail at how the management and distribution of EDKs to IoT devices 108 over network 110 at IoT site 102 of FIG. 1-2 takes place according to the present design. The devices derive their symmetric DEKs from their EDKs with which they encrypt their IoT data. In order for an authenticated device, such as device 108E on network 110 of FIG. 2, to send encrypted IoT data 114 to its designated gateway 104A for consumption, it is essential that the gateway has a mechanism for recovering the same/original symmetric DEK required to decrypt the IoT data that was encrypted by device 108E. The same is true for any other target recipient system/device that consumes IoT data 114. The common knowledge of the symmetric encryption key between the gateway/recipient and the device can be accomplished using a number of techniques provided by the present design. These are presented below.

Gateway PK Certificate-Based Key Distribution

In one embodiment, gateway 104A of FIG. 2 obtains a public key certificate from CA 208 by following the above-explained process in reference to device enrollment. In summary, it sends its public key in a CSR to CA 208 which after its validation returns it its PK certificate. It then broadcasts this PK certificate on network 110 to all the devices. Each edge device, such as device 108E, receives the digital certificate, verifies the signature of the gateway and extracts the public key of the gateway from the certificate per above teachings. It then encrypts its EDK that was issued by key server 204 above to obtain its wrapped or encrypted EDK.

It then periodically sends its wrapped or encrypted EDK before or after IoT data messages or simply IoT messages containing encrypted IoT data 114 that it sends to gateway 104A. This way gateway 104A receives the wrapped EDK of the device on a periodic basis. When it needs to decrypt the data from device 108E, it decrypts the wrapped EDK of device 108E by its private key to recover the same EDK issued by the key server to the device. It then derives the same DEK as the device using a salt value and a key derivation scheme as will be explained further below under key derivation, encryption and data encoding. Because the symmetric DEK thus obtained is the same DEK as was used by the device to encrypt its IoT data 114, gateway 104A can now use the DEK to decrypt encrypted IoT data from device 108E as needed.

Figure 5:
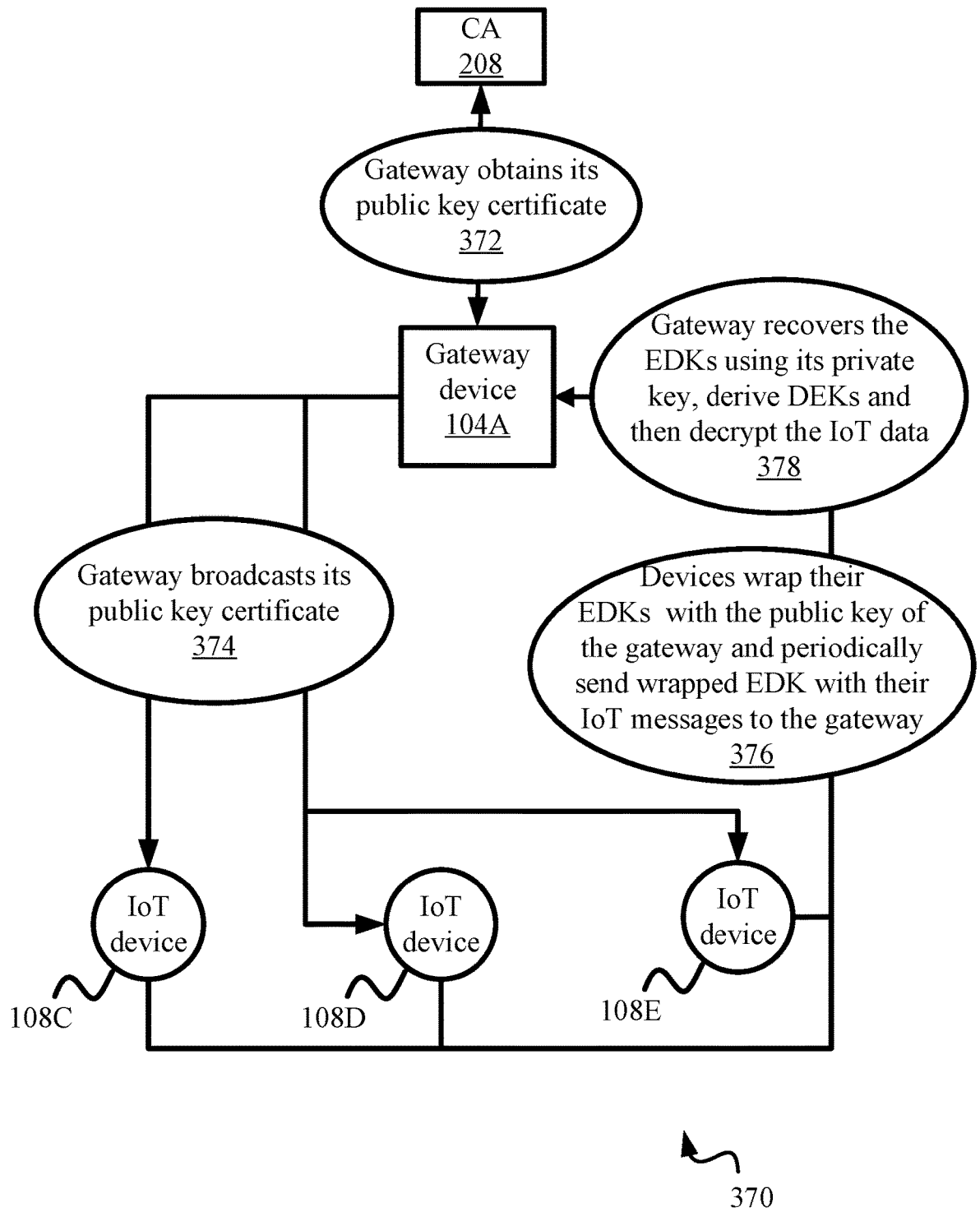
FIG. 5 shows a conceptual diagram of a key distribution scheme employing a public key certificate broadcasted by the gateway.

The key distribution scheme of such an embodiment is shown in FIG. 5. The drawing figure of embodiment 370 shows that gateway 104A first obtains it public key certificate or digital certificate from CA 208 per above explanation as shown by bubble 372. The gateway then broadcasts its digital certificate to all the devices as shown by bubble 374. The devices then encrypt/wrap their EDKs obtained from key server 204 (not shown in FIG. 5) and periodically send their wrapped EDK to the gateway as indicated by bubble 376. Then as shown by bubble 378, gateway 104A is then able to recover the EDKs using its private key, derive the DEKs, and then decrypt the IoT data per above explanation.

In alternate variations, the device sends just the key ID of its EDK to the gateway in a metadata of each transmitted and encrypted IoT message. The gateway then calls key server 204 with the key ID to obtain the same EDK and then derives the DEK per above explanation. Key derivation, encryption and data encoding will be discussed in detail further below.

DiffieHellman (DH) Key-Exchange Based Key Distribution

In an alternate embodiment, the DiffieHellman (DH) key-exchange method is innovatively employed by the design for key distribution. Those skilled in the art will understand that DH is a method of securely exchanging cryptographic keys over a public channel. In a DH scheme the exchanging parties can derive a shared secret from a set of publicly exchanged keys. More specifically, the two parties each have a first half of a DH key or private key that is only privately known to them. The second half of the key is public and is exchanged over a non-secure or public channel between the parties. Then, each party, by applying its private DH key to the public DH key of the other party, can derive the same key or shared secret. The derived key/secret is thus never exchanged on the public channel and is still commonly derived by the two parties. Such a derived key is typically used for session keys for symmetric encryption in the industry.

As an innovation over the prior art in the present embodiment employing a DH scheme, gateway 104A and devices 108 first generate their DH key with public and private halves/portions. Such DH keys can be generated by key server 204 which then issues and sends the keys to the gateway and the devices. Alternatively, the DH key may be generated locally on the gateway and/or the devices. In any case, the gateway then broadcasts the public portion of its DH key along with DH parameters (including prime number P and generator number G) to all the devices.

Each device receives the public key of the gateway along with the DH parameters and then apply their respective second half or private keys to arrive at the same shared key/secret between gateway 104A and all of devices 108A, 108B, . . . . The shared secret or key thus obtained is the unique EDK of the device. Each device, such as device 108D, then derives its unique DEK from the EDK per below explanation. It then encrypts its IoT messages with the DEK and then sends the encrypted messages along with its public DH portion/key to gateway 104A.

Since the gateway has access to its private DH key, it also derives the same share secret or EDK by applying is private DH key to the public DH key of the device received with the message. It then also derives the DEK of the device from the EDK as explained further below, and can then decrypts encrypted message of device 108D. For efficiency and other reasons, in some variations, the devices may send their DH keys to the gateway only periodically or on-demand, and not with each individual message. In these variations, the gateway would need to store or "remember" the EDK or the public DH key of the device for the requisite period of time.

Figure 6:
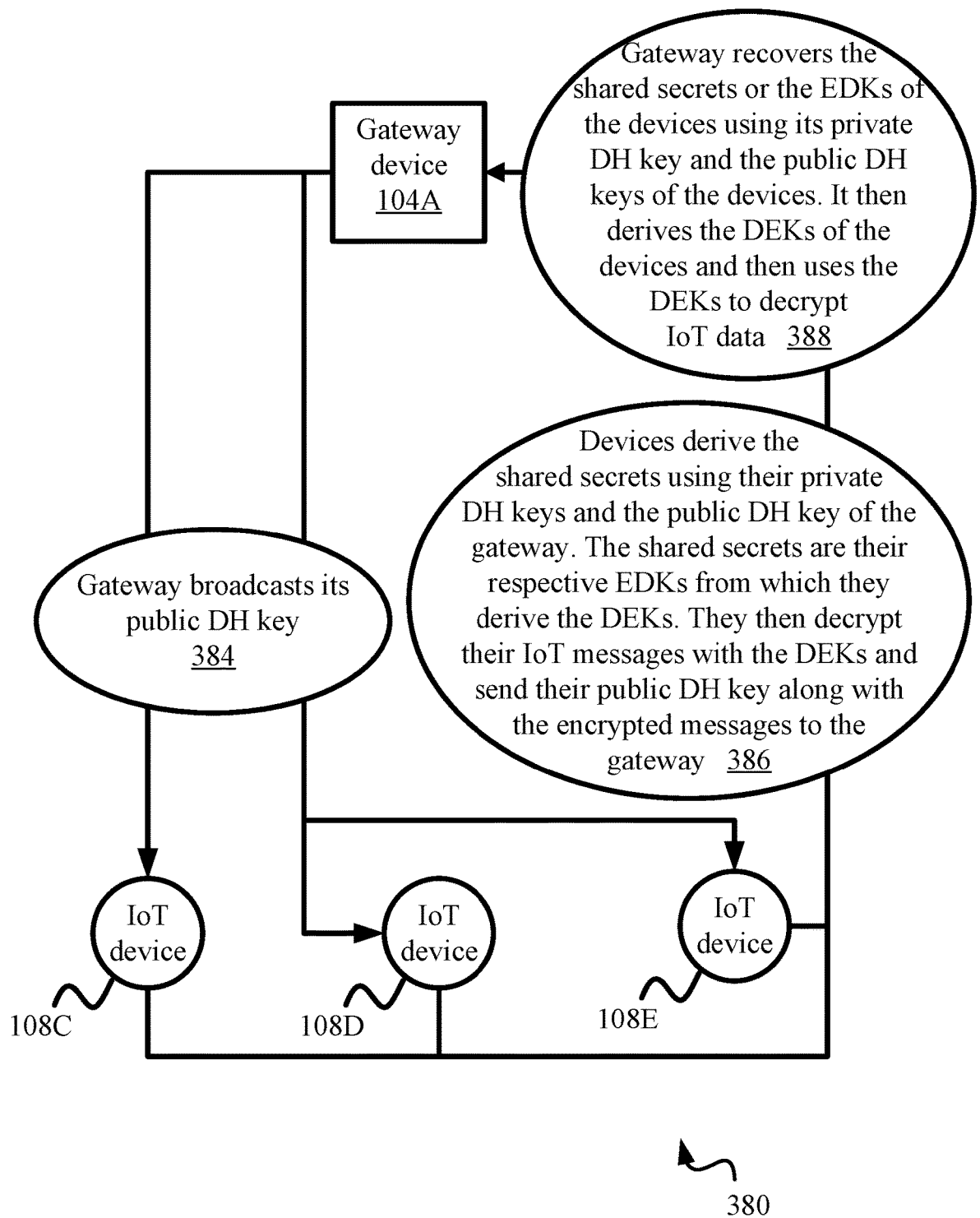
FIG. 6 shows a conceptual diagram of a key distribution scheme employing a DiffieHellman (DH) key-exchange method employed between the gateway and the devices.

The DH key-exchange method based key distribution scheme of the present embodiment is shown in FIG. 6. The drawing figure of embodiment 380 shows that gateway 104A broadcasts its public DH key and DH parameters to all the devices as shown by bubble 384. The devices then derive the shared secret key using their respective private DH keys and the public DH key of the gateway. The shared secret is their EDKs from which they derive their DEKs. They then send their respective public DH keys to the gateway along with their IoT data messages encrypted with the respective DEKs. The above is indicated by bubble 386 in FIG. 6. Then, as shown by bubble 388, the gateway is able to recover the shared secret or EDKs of the devices using its private DH key and the public DH keys of the devices. It then derives the DEKs of the devices from the EDKs for decrypting the IoT data from the devices per above explanation.

It is important that the devices are first properly authenticated in order to avoid a man in the middle (MITM) attack. In such an attack, a malicious device on network 110 may obtain the public DH key and DH parameters broadcasted by the gateway to derive an EDK. It may then impersonate as a legitimate device by sending its IoT messages and EDK to gateway 104A and start communicating with it. To avoid such an MITM attack, any of the authentication schemes described earlier may be used to ensure that all devices on network 110 are legitimate and authenticated devices.

Individual Shared Secret-Based Key Distribution

In still another embodiment, gateway 104A calls key manager 204 to generate a symmetric wrapping key per device. The gateway then sends the wrapping key and the device ID to the device. The device generates a per-message DEK by applying a key derivation function (KDF). Those skilled in the art will appreciate that a KDF derives one or more secret keys from a secret value such as a master key, a password, or a passphrase using a pseudorandom function. In the present embodiment, such a KDF is given by the following equation:

$$\text{per-message DEK} = \text{KDF}(\text{wrapping key}, \text{Device ID}, \text{counter}) \qquad \text{Eq. 1}$$

In Eq. (1) above, wrapping key is the wrapping key generated by the key server, and device ID is sent by gateway 104A to the device, such as device 108C of FIG. 2-4, along with the wrapping key. The device uses its own counter and generates a per-message DEK by applying Eq. (1) above. It then encrypts each IoT data message with its DEK to obtain the encrypted IoT message which it then sends to the gateway along with its device ID and the counter value for the message in plaintext form. When the gateway needs to decrypt encrypted an IoT data message from device 108C, it calls key manager/server 204 with the device ID for device 108C and obtains the same wrapping key for the device. It then also applies Eq. (1) above with the wrapping key, device ID and counter values received in the message. It thus arrives at the same individual shared secret or per-message DEK and is consequently able to decrypt the IoT message.

Figure 7:
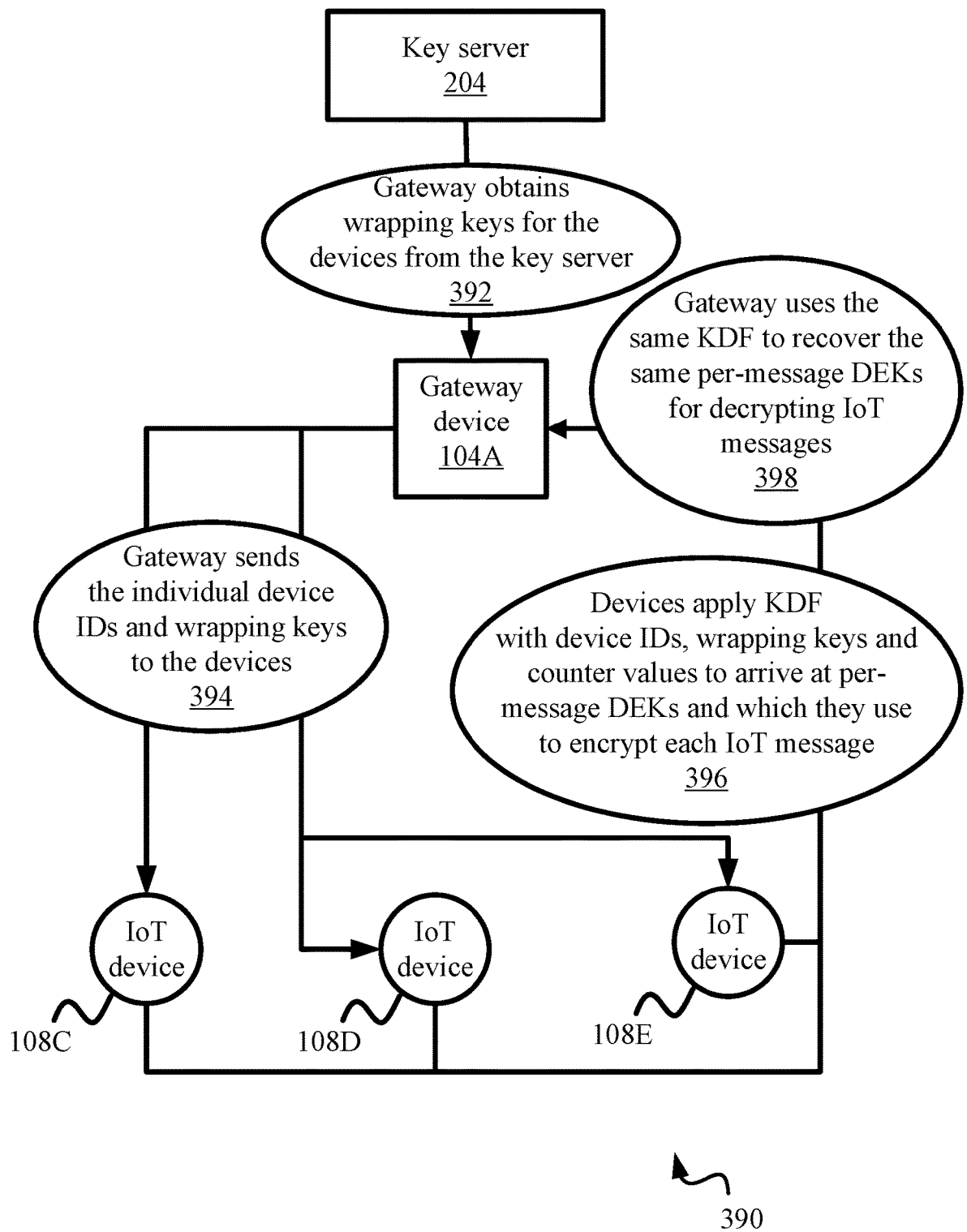
FIG. 7 shows an embodiment where instead of exchanged data keys (EDKs) issued by a key server, wrapping keys are used by the gateway and the devices to derive the per-message data encryption keys (DEKs).

The key distribution scheme of the present embodiment is shown in FIG. 7. The drawing figure of embodiment 390 shows that gateway 104A first obtains the wrapping keys for the devices from key server 204 as indicated by bubble 392. Then, as shown by bubble 394, the gateway sends the wrapping keys and device IDs of individual devices to the respective devices. The devices derive their per-message DEKs by applying Eq. (1) above.

They then encrypt each IoT data message with its corresponding DEK to obtain encrypted IoT data message which they send to the gateway along with their device ID and respective counter value. This is shown by bubble 396. Then, as shown by bubble 398, the gateway is able to recover the DEK for each IoT data message by applying Eq. (1) above and is then able to decrypt the IoT data message as needed.

In an exemplary implementation of the present embodiment, the device ID in the above embodiment is simply the MAC address of the device. In such an implementation, the gateway does not need to send the device ID to the devices because the devices know their own MAC addresses. They then send their MAC addresses to the gateway along with counter values and encrypted IoT messages per above explanation.

Key Derivation, Encryption and Data Encoding:

Let us now look in detail at how devices of FIG. 1-2 and above teachings are able derive the DEK from an EDK as provided in some embodiments, and then encrypt/decrypt IoT data 114 and encode it for transmission on network 110 according to the present design. Based on the above teachings, it should be clear by now as to how each edge device 108 possesses its exchanged data key (EDK) from key server 204 using one of the aforementioned key distribution schemes. As already noted, each device derives its data encryption key (DEK) or simply data key from its EDK, and it ultimately uses its DEK to encrypt IoT data 114. In one embodiment however, Eq. (1) was employed by both gateway 104A and devices 108 to derive a per-message DEK without requiring an EDK from the key server.

Thus, in some aspects of the present the encrypt-decrypt-once design, a DEK was used by the devices to encrypt all of their IoT data messages. However, in another embodiment employing Eq. (1) above, there was a per-message DEK that was used by the devices to encrypt each IoT data message. Furthermore, many viable approaches were taught above for authentication and provisioning, including enrollment and introduction, of the devices on network 110 at IoT site 102.

Regardless of the specific authentication/provision and key distribution scheme used, in the embodiments that employ EDKs issued from the key server, the devices derive their DEKs using a key derivation function (KDF). The KDF uses an initialization vector (IV) or a counter or salt that ensures that each derived DEK is unique.

In one exemplary implementation, such a derivation scheme for the DEKs is given by the following equation:

$$\text{DEK} = \text{HKDF}(\text{EDK}, \text{salt}) \qquad \text{Eq. 2}$$

In the above example, HKDF is a KDF based on HMAC, referred to as HMAC-based KDF per the prevailing techniques, and salt is a random number generated by the device at the time the DEK is derived by Eq. (2) of the present design above. Salt is then transmitted with the encrypted messages of the device as will be further explained below. As another security aspect of the present design, the DEKs are never stored by the devices, but rather only generated and kept in memory. This way, any chances of them being compromised from a secondary/off-line storage are eliminated.

The encryption regime employed by the devices to encrypt their IoT data by DEK is authenticated encryption because it simultaneously provides confidentiality, integrity, and authenticity assurances on the encrypted data. Then, the converse process of authenticated decryption only decrypts encrypted or ciphertext data if the integrity of the encrypted IoT data is verified, and fails otherwise. After the devices have encrypted their IoT data, they may temporarily store the data locally in its encrypted/ciphertext form, before transmitting it to the gateway(s)/recipient(s) per the teachings provided herein.

Figure 8:
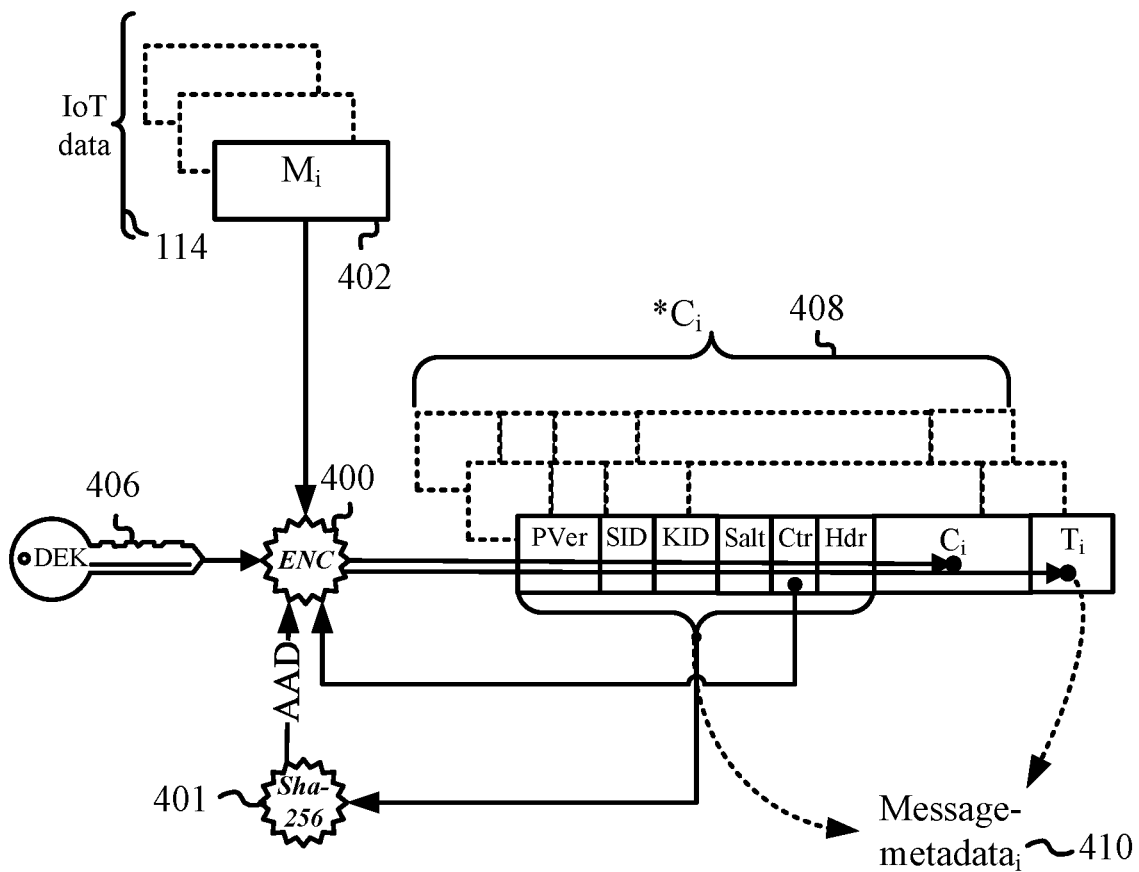
FIG. 8 illustrates the advanced encryption standard (AES) in galois/counter mode (GCM) mode of authenticated encryption as implemented by the devices of the present design.

Preferably, the authenticated encryption regime employs an advanced encryption standard (AES) in Galois/counter mode (GCM) mode of encryption. The advantages of such a GCM mode of symmetric key cryptographic ciphers include high efficiency and performance. Furthermore, AES/GCM provides authenticated encryption/decryption as will be explained further below. Such an authenticated encryption process is expressly visualized in FIG. 8 for an i-th IoT data message $M_i$ shown by reference numeral 402. Together such IoT data messages $M_i$ or simply IoT message $M_i$ constitute IoT data 114 of prior teachings as also shown in FIG. 8. The encryption operation on message $M_i$ with DEK 406 is indicated by ENC and marked by reference numeral 400. This authenticated encryption operation can be conveniently expressed by the following equation:

$$ENC(DEK, Counter_i, M_i, AAD) = C_i \text{ and } T_i, \quad \text{Eq. 3A}$$

In Eq. (3A) above $T_i$ is the authentication tag produced by the encryption step ENC and which may be later used by gateway 104A of FIG. 1-7 to verify the integrity of the ciphertext/encrypted IoT data message $C_i$ for authenticated decryption. Here AAD stands for additional authenticated data, and is obtained by preferably performing a secure hash algorithm, such as Sha-256, as shown by reference numeral 401, on fields: protocol version (PVer), sender ID (SID), key ID (KID), salt, counter (Ctr) and header (Hdr) of encrypted/ciphertext IoT message $C_i$. These fields will be explained in detail further below.

AAD along with authentication tag $T_i$ represents the metadata of encrypted IoT message $C_i$ as shown by reference numeral 410. The metadata is transmitted on network 110 of FIG. 1-2 along with each encrypted IoT data message $C_i$ as a combined transmitted message $*C_i$ shown by reference numeral 408 in FIG. 8. To avoid unnecessary repetition and confusion, we may simply refer to both messages $C_i$ and $*C_i$ as encrypted IoT messages knowing the distinction that the former is just the ciphertext equivalent of plaintext IoT message $M_i$ and the latter is a combination of $C_i$ and encoded metadata fields per below explanation. As such, we may only draw the distinction between $C_i$ and $*C_i$ as and when needed.

Authenticated encryption of Eq. (3A) is an example of authenticated encryption with associated data (AEAD) operation afforded by GCM. Such an encryption simultaneously provides confidentiality, integrity, and authenticity assurances on the data being encrypted.

Figure 9:
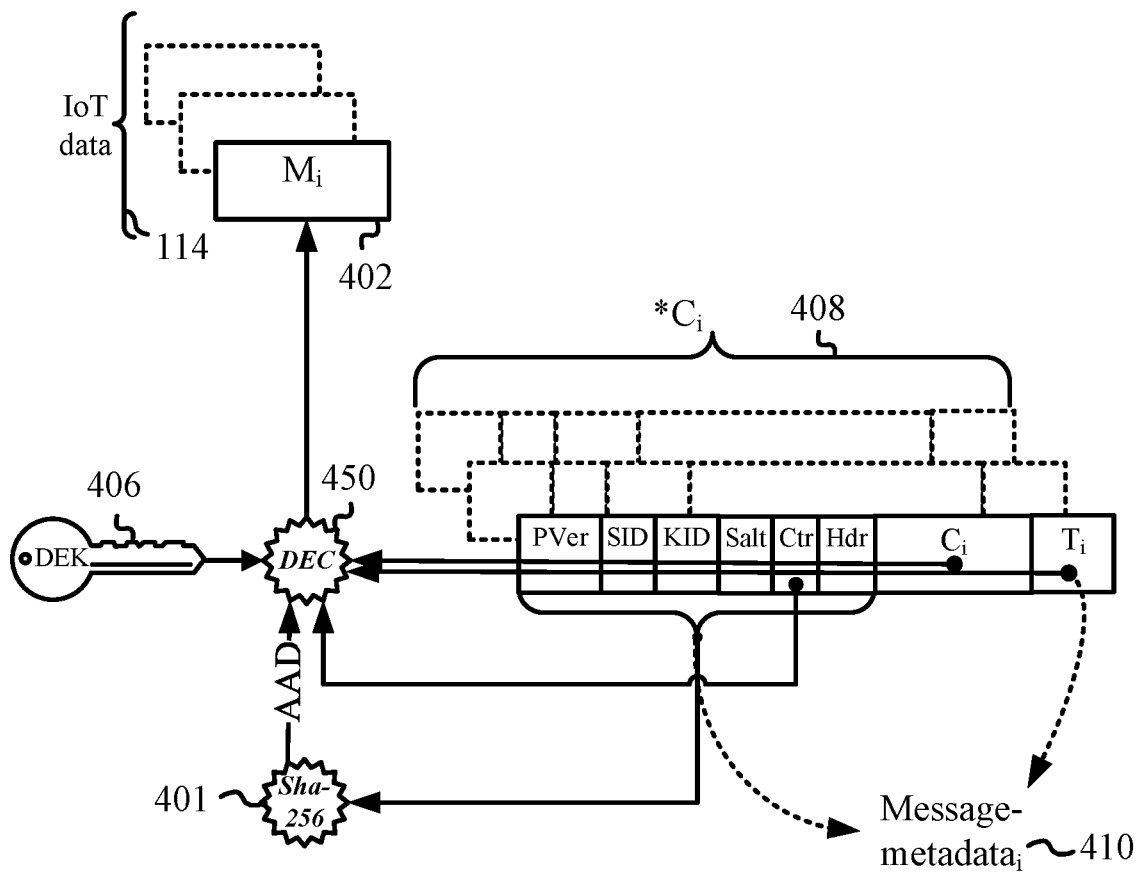
FIG. 9 illustrates the advanced encryption standard (AES) in galois/counter mode (GCM) mode of authenticated decryption as implemented by the devices of the present design.

The converse process of decryption is illustrated in FIG. 9, which contains many of the elements and their reference numerals from FIG. 8. Decryption operation is indicated by DEC marked by reference numeral 450 and since DEK 406 is symmetric, it is performed by inverting the order of operation and applying the authentication tag $T_i$ in Eq. (3A) as follows:

$$DEC(DEK, Counter_i, C_i, AAD, T_i) = M_i \text{ if the inputs are authentic, FAIL otherwise.} \quad \text{Eq.3B}$$

The transmission of IoT data from the devices on the network takes place in messages. Now, let us look at how the metadata fields are encoded in encrypted IoT messages $*C_i$ for transmission on IoT network 114 of FIG. 1-2 and prior teachings based on the instant principles. Each transmitted IoT data message $*C_i$ has type length value (TLV) encoding format. Specifically, and in one exemplary embodiment, each field in message $*C_i$ has a TLV encoding format and as provided in Table 1 below.

TABLE 1

| Field Name | Type |
| --- | --- |
| Protocol Version (PVer) | 0x01 |
| Sender ID (SID) | 0x12 |
| Key ID (KID) | 0x22 |
| Salt | 0x32 |
| Counter (Ctr) | 0x42 |
| Encrypted ciphertext ($C_i$) | 0x52 |
| Tag (Ti) | 0x62 |

In the above example, Type is two-byte value from 0x00 to 0xFF (Hexadecimal). The first byte 0x0, 0x1, 0x2 ... 0x6 of Type column above represents the field ID, such as PVer, SID, KID, ..., $T_i$ respectively. The second byte represents whether the corresponding field is an integer or a vector. Here 0x01 represents an integer and 0x02 represents a vector. Vectors are simply raw vectors of any length. Thus, in Table 1 above field PVer is an integer of a fixed length and encoding, such as four-byte unsigned value in network byte order. A vector consists of a length of type integer followed by the actual data. Thus, vector fields SID, KID, ... each will have a four-byte unsigned integer value representing the length of the data, followed by the data itself.

Now let us look at the various fields of our transmitted IoT data message $*C_i$ in further detail.

1. Protocol version (PVer). Protocol Version number or version field or attribute is used for tracking the version number or updates of the protocol being deployed for a given implementation of the present design. Different versions/updates of the protocol of the present design may signify varying encryption algorithms of various bit sizes for Eq. 3A and Eq. 3B above. Such versions may also include authenticated encryption/decryption algorithms other than GCM and any successor algorithm(s) to AES, as well as other suitable algorithms.

2. Key ID (KID). Key ID is an identifier for the EDK. This is the number assigned by key manager/server 204 of FIG. 1-2 and earlier explanation to the EDK issued to a device and is sent by the key server along with the EDK to the device. In one implementation, the key server may first hash the actual identification number of the EDK by an algorithm such as Sha-256 and then optionally performing truncation on it, prior to its transmission to the device. The purpose of sending this field in the metadata of transmitted message $*C_i$ is to ensure that the recipient/gateway also has the knowledge of the ID of EDK employed by the device to derive its DEK.

3. Salt. Salt is the salt used by the device to derive its DEK per Eq. (2) above and related explanation, and in one implementation is exemplarily a random number generated at the time of the derivation of the DEK. Since key ID of the EDK (KID) and the salt is transmitted with the message, the gateway/recipient is able to generate the same DEK as the device had used to encrypt its data by applying Eq. (2) above.

4. Counter (Ctr). Counter is an initialization vector used for each invocation of authenticated encryption ENC 400 of FIG. 8. It is a monotonically increasing number and is incremented each time a new message $*C_i$ is sent by the device. When/if a new DEK is derived by the device, for example, in the embodiment employing a unique DEK per message *$C_i$, then the counter may be reset. If two processes or threads of an implementation use the same DEK then they must ensure they use unique counters. Therefore, it is preferable to derive a different DEK for each process or thread.

5. Encrypted/ciphertext message $C_i$. This is the ciphertext data produced by the device by applying Eq. (3A) above on plaintext IoT message $M_i$.
6. Tag ($T_i$). Authentication tag $T_i$ is the authenticated encryption tag by applying GCM as expressed in Eq. (3A) above. As already noted, it is used by the recipient/gateway to verify the integrity and authenticity of transmitted message *$C_i$ by applying Eq. (3B) above during authenticated decryption.
7. Encrypted message header (Hdr). This is the TLV header containing the types, lengths and values of all the above fields 1-6, except the Hdr field itself.

As noted earlier that AAD in Eq. (3A) above is provided to encryption operation ENC 400 of FIG. 8 by computing a Sha-256 hash of the various metadata fields of transmitted message *$C_i$. More specifically, $$AAD=Sha\text{-}256(PVer, SID, KID, salt, Counter_i, Hdr), \quad \text{Eq. 4}$$

Sha-256 in Eq. (4) above is performed on the above-specified fields in their TLV encoded form. This computation is performed in IoT devices 108 in their memory. In other words, the computation of Eq. (4) above is performed after the specified fields have been TLV-encoded in the memory. This is to ensure that AAD is computed on the fields in their final form before transmission. The fields themselves are transmitted in their plaintext and unencrypted form. That way, when recipient/gateway receives transmitted message *$C_i$, it is able to compute the same hash by applying Eq. (4) above and then providing that as input to Eq. (3B) for decryption. As a result, the authenticated decryption of Eq. (3B) will only succeed if all of the metadata of transmitted IoT message *$C_i$ as well as encrypted/cyphertext message $C_i$ itself has not been tampered with.

In various embodiments above, the gateway at an IoT site was used as the key recipient of encrypted IoT data sent by the IoT devices. In related variations and as already noted above, the target recipient of such IoT data may be any other server or system local to the IoT site or at a corporate data center, depending on the specific implementation. A variety of such implementations can benefit from the encrypt-decrypt-once benefits of the present design based on the above teachings.

The above-taught techniques provide effective means for a person of average skill to secure an IoT infrastructure in an efficient and end-to-end manner by taking advantage of the present encrypt-decrypt-once technology. Thus, IoT data 114 of FIG. 1-2 on network 110 on site 102 is encrypted only once and remains encrypted throughout the various stages of its lifecycle until its final consumption. As a result of the present design, any exposure to IoT data 114 in its plaintext form from its inception to its consumption is thus prevented. Furthermore, the techniques also provide technological efficiencies by performing encryption only once and thereby reducing the burden on computing and other resources of the IoT infrastructure.

In view of the above teaching, a person skilled in the art will recognize that the methods of present invention can be embodied in many different ways in addition to those described without departing from the principles of the invention. Therefore, the scope of the invention should be judged in view of the appended claims and their legal equivalents.

What is claimed is:

1. A secure internet-of-things (IoT) network, comprising:
(a) one or more edge devices and at least one gateway device on said secure IoT network, said one or more edge devices and said at least one gateway device each comprising at least one memory device storing computer-readable instructions and at least one microprocessor coupled to said at least one memory device for executing said computer-readable instructions;
(b) IoT data generated by said one or more edge devices for transmission on said secure IoT network to said at least one gateway device;
(c) a module on said secure IoT network for provisioning said one or more edge devices; and
(d) a key server for distributing an exchanged data key (EDK) to each of said one or more edge devices;
wherein each of said one or more edge devices derives a data encryption key (DEK) from said EDK and then encrypts said IoT data by an authenticated encryption employing said DEK to obtain encrypted IoT data for said transmission, and wherein said at least one gateway device decrypts said encrypted IoT data by an authenticated decryption employing said DEK derived from said EDK, and wherein a wrapped EDK is included in said transmission, said wrapped EDK obtained by said one or more edge devices by encrypting said EDK with a public key of said at least one gateway device, said public key obtained from a public key certificate broadcasted by said at least one gateway device to said one or more edge devices.

2. The secure IoT network of claim 1, wherein a certificate authority is used to issue a public key certificate to said one or more edge devices for enrollment on said secure IoT network.

3. The secure IoT network of claim 2, wherein said public key certificate undergoes authentication checks for authenticating said one or more edge devices on said secure IoT network.

4. The secure IoT network of claim 1, wherein said module in element (c) is a provisioning server that authenticates and then provisions said one or more edge devices on said secure IoT network.

5. The secure IoT network of claim 4, wherein one of a public-private keypair and a digital certificate is included in said one or more edge devices at a time of their manufacturing.

6. The secure IoT network of claim 1, wherein said key server is also utilized for authenticating said one or more edge devices.

7. The secure IoT network of claim 6, wherein a salted challenge response authentication mechanism (SCRAM) protocol is used for authenticating said one or more edges device with said key server.

8. The secure IoT network of claim 1, wherein an authentication mechanism of an underlying protocol on said secure IoT network is used for authenticating said one or more edge devices.

9. The secure IoT network of claim 1, wherein said one or more edge devices and said at least one gateway device derive said DEK from said EDK by employing a key derivation function based on a hash-based message authentication code (HKDF).

10. The secure IoT network of claim 1, wherein said authenticated encryption employs an advanced encryption standard (AES) in Galois/counter mode (GCM).

11. The secure IoT network of claim 10, wherein additional authentication data (AAD) is provided to said authenticated encryption, said AAD comprising a secure hash algorithm-256 (Sha-256) hash over fields including a protocol version (PVer), a sender ID (SID), a key ID (KID), a salt, a counter (Ctr) and a header (Hdr) of an encrypted IoT message of said encrypted IoT data for said transmission.

12. The secure IoT network of claim 1, wherein a type length value (TLV) encoding is employed to encode each field of an encrypted IoT message of said encrypted IoT data for said transmission.

13. A computer-implemented method of securing internet-of-things (IoT) data on an IoT network, said method comprising the steps of:
  (a) provisioning at least one edge device on said IoT network;
  (b) generating said IoT data by said at least one edge device;
  (c) distributing an exchanged data key (EDK) from a key server on said IoT network to said at least one edge device and deriving a data encryption key (DEK) at said at least one edge device;
  (d) encrypting at said at least one edge device said IoT data with said DEK to obtain encrypted IoT data, said encrypting utilizing an authenticated encryption;
  (e) transmitting said encrypted IoT data from said at least one edge device to a gateway device;
  (f) decrypting with said DEK said encrypted IoT data at said gateway device; and
  (g) sending a wrapped EDK along with said encrypted IoT data from said at least one edge device to said gateway device, said wrapped EDK obtained by said at least one edge device by encrypting said EDK with one of a public key of said gateway device and a shared secret of a DiffieHellman key-exchange between said gateway device and said at least one edge device.

14. The computer-implemented method of claim 13 utilizing a provisioning server for authenticating and then configuring said at least one edge device in said step (a).

15. The computer-implemented method of claim 14 utilizing a certificate authority for issuing a public key certificate to said at least one edge device for said authenticating.

16. The computer-implemented method of claim 14 including in said at least one edge device at a time of its manufacturing, one of a public-private keypair and a digital certificate, for said authenticating.

17. The computer-implemented method of claim 13 utilizing a salted challenge response authentication mechanism (SCRAM) protocol for authenticating said at least one edge device with said key server.

18. The computer-implemented method of claim 13 utilizing an authentication mechanism of an underlying protocol on said IoT network for authenticating said at least one edge device.

19. The computer-implemented of claim 13 employing a type length value (TLV) encoding for encoding each field of an encrypted IoT message of said encrypted IoT data for said transmitting.

\* \* \* \* \*